(12) United States Patent
Dittus

(10) Patent No.: US 10,600,088 B2
(45) Date of Patent: Mar. 24, 2020

(54) TARGETING ONLINE ADS BASED ON HEALTHCARE DEMOGRAPHICS

(71) Applicant: Audience Partners LLC, Fort Washington, PA (US)

(72) Inventor: Jeffrey A. Dittus, Penn Valley, PA (US)

(73) Assignee: Audience Partners LLC, Fort Washington, PA (US)

( * ) Notice: Subject to any disclaimer, the term of this patent is extended or adjusted under 35 U.S.C. 154(b) by 1023 days.

(21) Appl. No.: 14/263,559

(22) Filed: Apr. 28, 2014

(65) Prior Publication Data

US 2014/0324447 A1 Oct. 30, 2014

Related U.S. Application Data

(60) Provisional application No. 61/816,471, filed on Apr. 26, 2013.

(51) Int. Cl.
*G06Q 30/02* (2012.01)

(52) U.S. Cl.
CPC .................. *G06Q 30/0269* (2013.01)

(58) Field of Classification Search
CPC ........ G06Q 50/22; G06Q 50/24; G06Q 40/08; G06Q 10/10; G06F 19/322; G06F 17/30; G06F 19/30; G06F 19/32; G06F 19/321; G06F 19/324; G06F 19/325; G06F 19/326; G06F 19/328; G06F 19/34; G06F 19/3418; G06F 19/3456; G06F 19/3462; G06F 19/3468; G06F 19/3475; G06F 19/3481; G06F 19/36; A61N 1/08; G16H 10/00;

(Continued)

(56) References Cited

U.S. PATENT DOCUMENTS

| 2004/0139025 A1* | 7/2004 | Coleman ............. G06F 21/6254 705/51 |
| 2007/0061243 A1* | 3/2007 | Ramer .................. G06Q 10/10 705/37 |

(Continued)

OTHER PUBLICATIONS

Barth, A., "HTTP State Management Mechanism," Request for Comments: 6265, Internet Engineering Task Force (IETF), ietf.org, Apr. 2011.

*Primary Examiner* — Victoria P Augustine
*Assistant Examiner* — Chad A Newton
(74) *Attorney, Agent, or Firm* — Sterne, Kessler, Goldstein & Fox P.L.L.C.

(57) ABSTRACT

Systems and methods allow targeting messages to consumers using a plurality of records for a group of consumers, each record comprising healthcare demographic information (HDI) associated with individual consumers. HDI can include insured status information identifying whether a consumer likely has health insurance, which is received from at least one health services provider. A cookie can correlates a consumer's browser to healthcare demographic information. The cookie allows subsequent association of HDI with the browser, without exposing personally identifiable information of the first consumer to advertisers. Systems and methods can also associate an ID of a consumer's electronic device with the HDI, allowing mobile device and set top boxes to serve relate ads to the consumer. Consumers can be targeted based on selected HDI criteria.

20 Claims, 14 Drawing Sheets

(58) Field of Classification Search
CPC ........ G16H 10/20; G16H 10/40; G16H 10/60;
G16H 10/65; G16H 15/00; G16H 20/00;
G16H 20/10; G16H 20/13; G16H 20/17;
G16H 20/30; G16H 20/40; G16H 20/60;
G16H 20/70; G16H 20/90; G16H 30/00;
G16H 30/20; G16H 30/40; G16H 40/00;
G16H 40/20; G16H 40/40; G16H 40/60;
G16H 40/63; G16H 40/67; G16H 50/00;
G16H 50/20; G16H 50/30; G16H 50/50;
G16H 50/70; G16H 50/80; G16H 70/00;
G16H 70/20; G16H 70/40; G16H 70/60;
G16H 80/00

See application file for complete search history.

(56) References Cited

U.S. PATENT DOCUMENTS

| | | | |
|---|---|---|---|
| 2013/0054346 A1* | 2/2013 | Sekura | G06Q 30/0241 705/14.39 |
| 2014/0108029 A1* | 4/2014 | Kim | G06Q 50/22 705/2 |

* cited by examiner

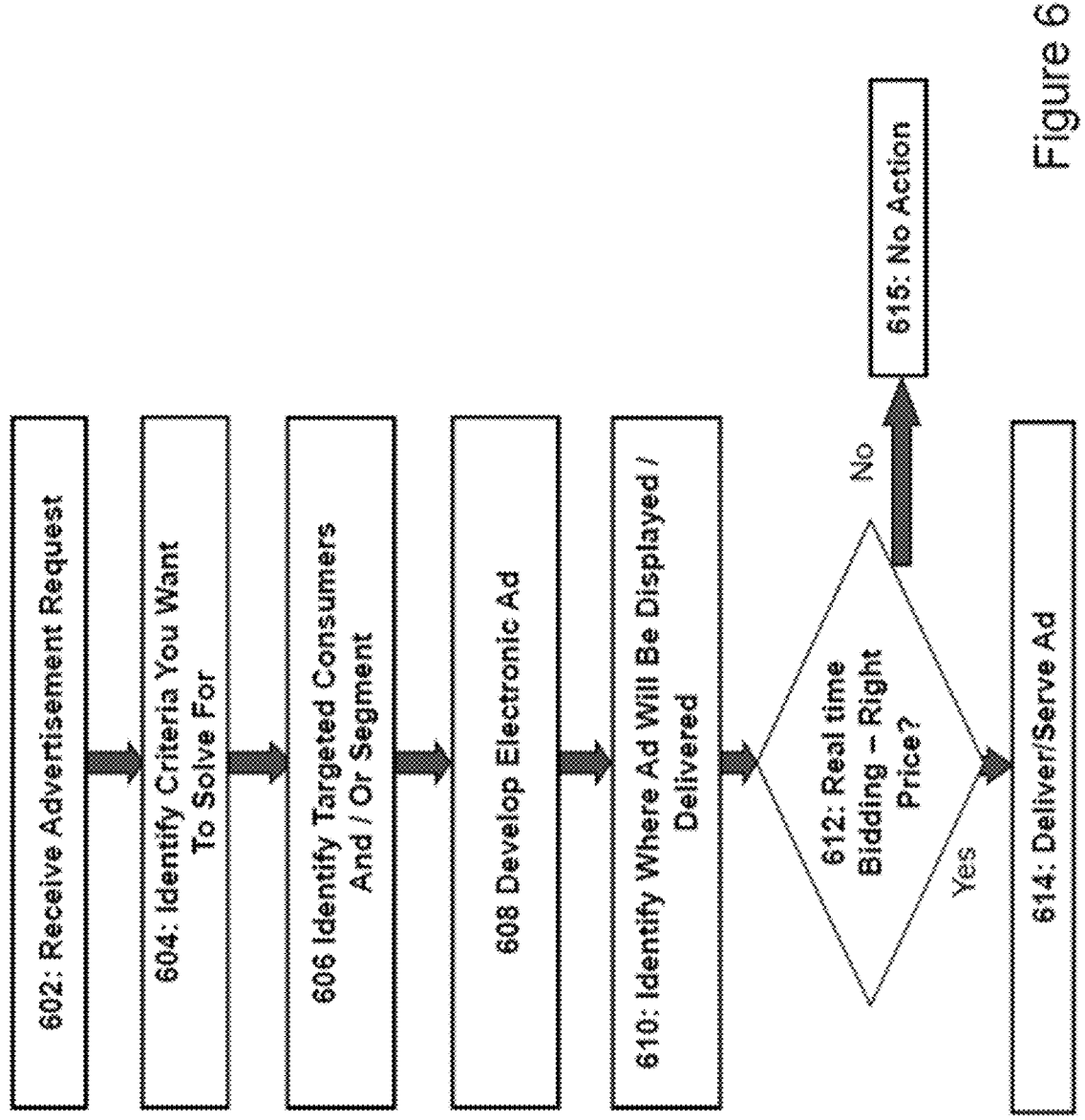

| D1: Healthcare | D2: Consumer | D3: Social |
|---|---|---|
| Insured Status<br>known conditions<br>working for company offering insurance<br>medical history data | Premium/Specialty<br>Household Income<br>Wealth<br>Investor Capacity | Facebook<br>Linked In<br>Twitter<br>Pinterest<br>Google |
| D4: Demographic | D5: Economic | D6: Intent |
| Age/Life stage<br>Occupation - Employer<br>Presence of Children<br>Household Composition | Home Value<br>Home Equity<br>Financing Type<br>Net Worth<br>HH Income | Paid Search<br>Search Retargeting<br>Online Polling |
| D7: Lifestyle | D8: Behavioral | D9: Geographic |
| Purchasing Patterns<br>Online Activity<br>Market Channel Responsiveness<br>Affinity Groups<br>Magazine Subscriptions | Charitable Giving<br>Employer<br>Avocation & Interest | Lat/Long of Every US Household<br>Zip Codes<br>Census Blocks & Tracks<br>Cable Zones<br>Radio Zones |

Figure 8

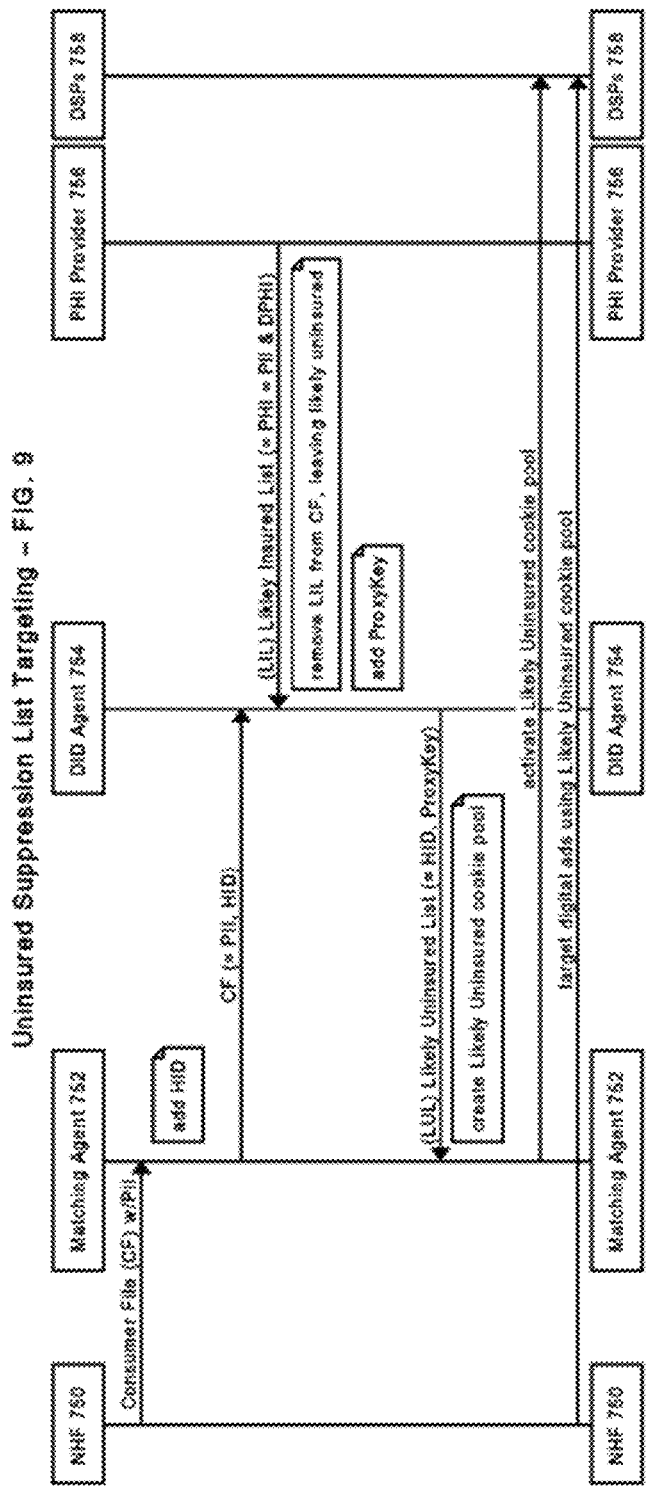

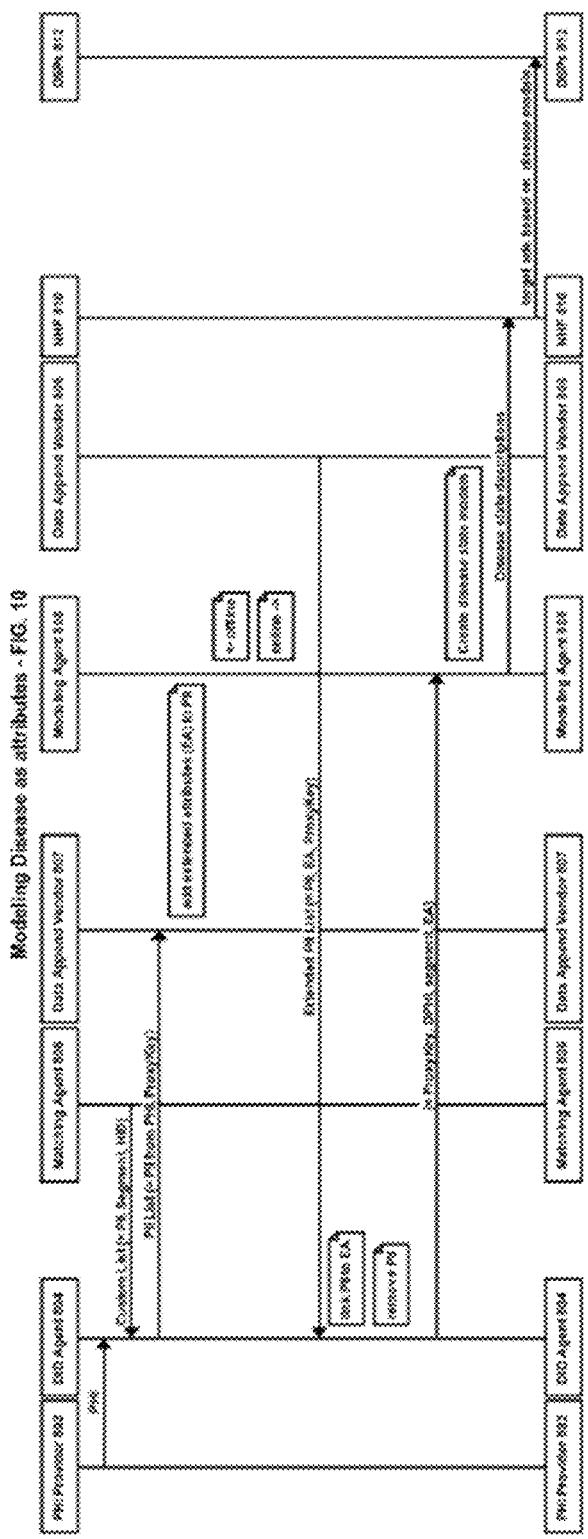

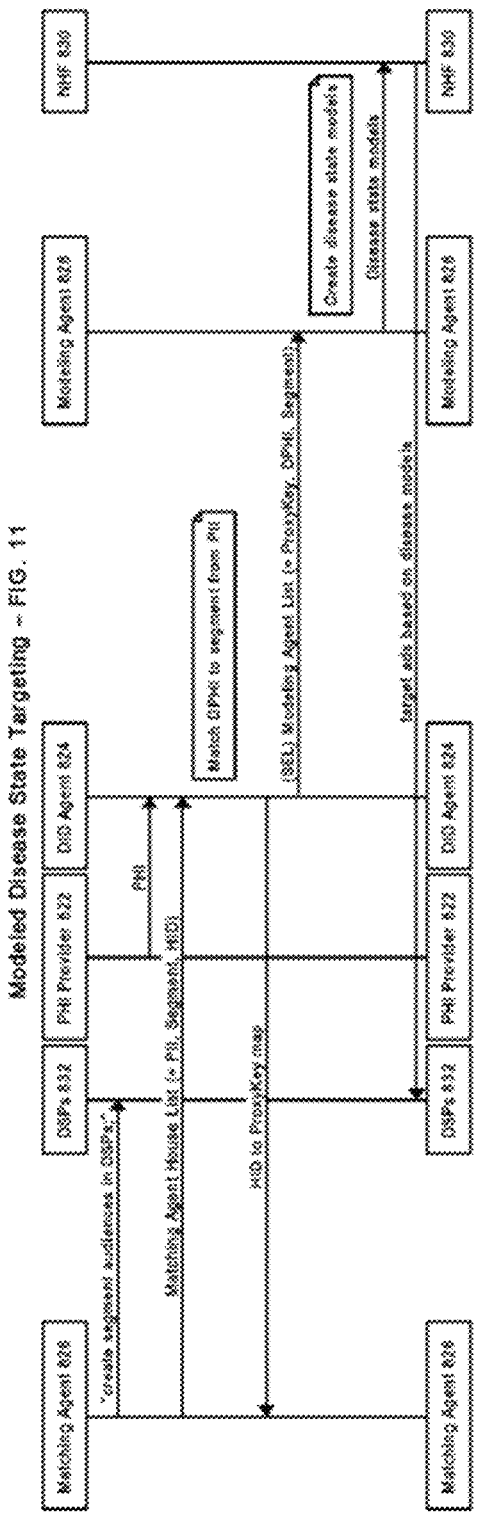

TARGETING ONLINE ADS BASED ON HEALTHCARE DEMOGRAPHICS

RELATED APPLICATIONS

This application claims priority to U.S. Provisional Patent Application No. 61/816,471, entitled "Targeting Online Ads Based on Healthcare Demographics," filed on Apr. 26, 2013, the contents of which are hereby incorporated by reference in its entirety.

TECHNOLOGY FIELD

The present invention relates generally to electronic and network-based communications, and more particularly to systems and methods for facilitating targeted advertisements on a computer network, mobile device network, and/or Internet Protocol (IP)-enabled television system, related to healthcare status of individuals or household members.

BACKGROUND

Traditional advertising has been done using traditional media, such as print advertising, TV, and radio. Currently, media consumption is transitioning from conventional communication means—such as broadcast television and radio, print media, and postal mail—to electronic media distributed, for example, over the Internet and via electronic mail (i.e., email). However, advertising spending continues to focus heavily on traditional communications means. Web-based and electronic communications are becoming the industry standard for personal and business use. Increasingly, news, advertisements, business communications, personal communications, and other information (collectively hereinafter also referred to as "media consumption") are being created, stored, and transmitted electronically via computing networks, such as the Internet. A computing network, as used herein, refers to a collection of desktop computers, laptop computers, mobile phones, handheld or mobile computing devices (collectively "personal computing device" or "computing device") interconnected by communication channels that facilitate communications among users and allows users to share resources. At work, employees access such networks, along with their associated corporate computing resources from their local computing device, on a daily basis in order to perform their jobs. Away from work, people similarly access such networks and resources, typically through home, mobile, or remote connections. Numerous types of electronic and network connections and communication channels are ubiquitous in the industry and well known to one familiar with this technology and industry. For example: wired and wireless connections, a local area network (LAN), a wide area network (WAN), a virtual private network (VPN), high speed connections of various types, intranets, extranets, the Internet, and the like.

Online advertising often prices ads on a per impression basis, where an impression is a single instance of displaying an ad to an individual. There has been some progress in tailoring ad impressions to individuals based on some limited information about an individual, such as based on websites they have visited, interests, demographic information, or the like. However, advertisements for health insurance, medications, or other healthcare products or services may not lend themselves to easily targeting individuals likely to be interested in the advertised product or service. Targeting individuals based on needs or interests related to healthcare may face additional hurdles not addressed in traditional online advertisement mechanisms. For example, in the U.S., the Health Insurance Portability and Accountability Act of 1996 (HIPAA) places certain restrictions on how healthcare information may be accessed, shared, and used.

Paying for an impression to an individual that is not interested in the product or service, unlikely to be interested in the future, or has likely already purchased the product or service, may be a wasted impression that costs the advertisement campaign precious capital. Furthermore, the ability to serve up individual impressions on a screen to a specific individual presents a unique opportunity and challenge not addressed in traditional media campaigns. As such, there remains a need to create strategies and technologies that deliver individual advertising experiences to consumers to spread the word about a healthcare product or service in a cost effective manner.

Title II of HIPAA, known as the Administrative Simplification (AS) provisions, requires the establishment of national standards for electronic healthcare transactions and national identifiers for providers, health insurance plans, and employers.

Title II of HIPAA defines policies, procedures and guidelines for maintaining the privacy and security of individually identifiable health information, as well as outlining numerous offenses relating to healthcare and sets civil and criminal penalties for violations. It also creates several programs to control fraud and abuse within the healthcare system. However, the most significant provisions of Title II are its Administrative Simplification rules. Title II requires the Department of Health and Human Services (HHS) to draft rules aimed at increasing the efficiency of the healthcare system by creating standards for the use and dissemination of healthcare information.

These rules apply to "covered entities" as defined by HIPAA and the HHS. Covered entities include health plans, healthcare clearinghouses, such as billing services and community health information systems, and health services providers that transmit healthcare data in a way that is regulated by HIPAA.

Per the requirements of Title II, the HHS has promulgated five rules regarding Administrative Simplification: the Privacy Rule, the Transactions and Code Sets Rule, the Security Rule, the Unique Identifiers Rule, and the Enforcement Rule. The HIPAA Privacy Rule regulates the use and disclosure of Protected Health Information (PHI) held by "covered entities" (generally, healthcare clearinghouses, employer sponsored health plans, health insurers, and medical service providers that engage in certain transactions.) By regulation, the Department of Health and Human Services extended the HIPAA privacy rule to independent contractors of covered entities who fit within the definition of "business associates." PHI is any information held by a covered entity which concerns health status, provision of healthcare, or payment for healthcare that can be linked to an individual. This is interpreted rather broadly and includes any part of an individual's medical record or payment history. Covered entities must disclose PHI to the individual within 30 days upon request. They also must disclose PHI when required to do so by law, such as when reporting suspected child abuse to state child welfare agencies.

A covered entity may disclose PHI to facilitate treatment, payment, or healthcare operations without a patient's express written authorization. Any other disclosures of PHI (Protected Health Information) require the covered entity to obtain written authorization from the individual for the disclosure. However, when a covered entity discloses any PHI, it must make a reasonable effort to disclose only the minimum necessary information required to achieve its purpose.

While the Privacy Rule pertains to all Protected Health Information (PHI) including paper and electronic, the Security Rule deals specifically with Electronic Protected Health Information (EPHI). The standards and specifications include: administrative safeguards, which include policies and procedures designed to clearly show how the entity will comply with the act; physical safeguards, which require controlling physical access to protect against inappropriate access to protected data; and technical safeguards, which require controlling access to computer systems and enabling covered entities to protect communications containing PHI transmitted electronically over open networks from being intercepted by anyone other than the intended recipient. Entities that must comply with HIPAA requirements are referred to as covered entities.

As used in information security, Personally Identifiable Information (PII) is information that can be used on its own or with other information to identify, contact, or locate a single person, or to identify an individual in context. NIST Special Publication 800-122 defines PII as any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information. For example, a user's IP address as used in a communication exchange is classed as PII regardless of whether it may or may not on its own be able to uniquely identify a person.

Although the concept of PII is old, it has become much more important as information technology and the Internet have made it easier to collect PII through breaches of internet security, network security and web browser security, leading to a profitable market in collecting and reselling PII. PII can also be exploited by criminals to stalk or steal the identity of a person, or to plan a person's murder or robbery, among other crimes. As a response to these threats, many website privacy policies specifically address the collection of PII, and lawmakers have enacted a series of legislation to limit the distribution and accessibility of PII.

PII can include, for example:
Full name (if not common)
email address (if private from an association/club membership, etc.)
National identification number
IP address (in some cases)
Vehicle registration plate number
Driver's license number
Face, fingerprints, or handwriting
Credit card numbers
Digital identity
Date of birth
Birthplace
Genetic information The following are less often used to distinguish individual identity, because they are traits shared by many people. In general, these traits will not be considered PII. However, they are potentially PII, because they may be combined with other personal information to identify an individual.
First or last name, if common
Country, state, or city of residence
Age, especially if non-specific
Gender or race
Name of the school they attend or workplace
Grades, salary, or job position
Criminal record Protected Health Information (PHI) is any information about health status, provision of healthcare, or payment for healthcare that can be linked to a specific individual. This can be interpreted rather broadly and includes any part of a patient's medical record or payment history. PHI is often sought out in datasets for de-identification before researchers share the dataset publicly.

Under the US Health Insurance Portability and Accountability Act (HIPAA), PHI that is linked based on the following list of 18 identifiers must be treated with special care:
Names
All geographical identifiers smaller than a state, except for the initial three digits of a zip code if, according to the current publicly available data from the Bureau of the Census: the geographic unit formed by combining all zip codes with the same three initial digits contains more than 20,000 people; and [t]he initial three digits of a zip code for all such geographic units containing 20,000 or fewer people is changed to 000
Dates (other than year) directly related to an individual
Phone numbers
Fax numbers
Email addresses
Social Security numbers
Medical record numbers
Health insurance beneficiary numbers
Account numbers
Certificate/license numbers
Vehicle identifiers and serial numbers, including license plate numbers
Device identifiers and serial numbers
Web Uniform Resource Locators (URLs)
Internet Protocol (IP) address numbers
Biometric identifiers, including finger, retinal and voice prints
Full face photographic images and any comparable images
Any other unique identifying number, characteristic, or code except the unique code assigned by the investigator to code the data

SUMMARY

Embodiments of the present invention may address and overcome one or more of the above shortcomings and drawbacks by providing systems and methods for provide advertising services to consumers based on healthcare demographic information without violating privacy rules. in an automation system for use in an in vitro diagnostics (IVD) environment.

According to one embodiment of the invention, a method for targeting messages to consumers includes the step of receiving at a server a first plurality of records for a group of consumers, each record comprising healthcare demographic information associated with individual consumers within the group of consumers, wherein at least one record is associated with a first consumer and wherein the healthcare demographic information comprises insured status information identifying whether the consumer likely has health insurance, wherein the insured status information is received from at least one health services provider used by each consumer. The method further includes the steps of determining the likely identity of the first consumer browsing a first website, creating a cookie at the server that correlates a browser of the first consumer to healthcare demographic information associated with the first consumer using a processor, and sending the cookie to the browser of the first consumer across the internet. The cookie can be configured to allow subsequent association of the healthcare demographic information with the browser at a second website, without exposing personally identifiable information of the first consumer to advertisers.

According to one aspect of some embodiments, the method can include causing an advertisement to be transmitted to the browser when the cookie is detected at the second website. The method may also include the step of determining if the healthcare demographic information associated with the cookie matches selected demographic criteria to determine whether to bid on an advertisement impression. The method may also include the step of creating a record of the cookie in a second plurality of records that can be shared with partners to determine which browsers correspond to selected demographic criteria.

In some embodiments, a subset of the healthcare demographic information includes an identification that the first consumer is in a group of consumers that have an increased likelihood of having a predetermined health condition. In some embodiments, a trusted intermediary can be utilized to correlate healthcare demographic information with the first consumer without exposing protected health information of the first consumer to third parties. In some embodiments, a subset of the healthcare demographic information includes voluntary information received from a third party, where the first consumer has authorized the third party to share the voluntary information.

According to another embodiment of the invention, a method for displaying a message to consumers includes the step of receiving, at a server, information from a computing device that includes at least one identifier that correlates the computing device with a first set of healthcare demographic information associated with a likely identity of a user of the computing device. The method further includes receiving, at the server, a second set of healthcare demographic information that includes information for targeting advertisements to consumers and comparing the first and the second sets of healthcare demographic information to determine a responsive set of identifiers that match the second set of healthcare demographic information. The method further includes receiving, across the Internet, a request to serve an ad impression to the computing device and requesting, automatically using a processor, display of an ad impression to computing device if the at least one identifier is among the responsive set of identifiers. The first set of healthcare demographic information comprises insured status information identifying whether the user likely has health insurance, and wherein the insured status information is received from at least one health services provider used by the user.

According to one aspect of some embodiments, the second set of healthcare demographic information comprises an identification that the user is in a group of consumers that have an increased likelihood of having a predetermined health condition. In some embodiments, the method can include the step of automatically generating, using the processor, a bid for the right to display the ad impression. In some embodiments, the first set of healthcare demographic information is received from the at least one health services provider via a trusted intermediary. In some embodiments, the electronic device is a set top box associated with at least one household and is configured to display live TV to viewers in the household. In some embodiments the electronic device is a mobile device. In some embodiments, the electronic device is a computer with a browser.

According to another embodiment of the invention, a method for targeting a message to selected consumers includes the step of receiving at a server a request for displaying one or more advertisements to a group of individuals, the request including selected healthcare demographic criteria to define the group, wherein the healthcare demographic criteria includes information that correlates to information provided by health services providers that have provided services to the members of the group of individuals. The method further includes steps of determining, via a processor, a subset of electronic records of a database that match the selected healthcare demographic criteria, identifying at least one electronic device associated with the subset of electronic records, and transmitting the one or more advertisements to the electronic device.

According to one aspect of some embodiments, the method includes bidding on an ad exchange for ad impressions associated with a browser running on the electronic device. In some embodiments, the step of identifying at least one electronic device associated with the subset of electronic records is performed by a cable services provider and the electronic device is associated with at least one cable services subscriber. In some embodiments, the electronic device is a set top box associated with at least one household and is configured to display live TV to viewers in the household. In some embodiments, the electronic device is a mobile device. In some embodiments, the electronic device is a computer with a browser.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 6 is a flow chart showing exemplary processes for processing a request for targeting delivery of an online advertisement in accordance with some embodiments of the invention;

FIG. 8 shows exemplary data sources that may be used to target individuals for online advertisements;

FIG. 9 is a system flow diagram targeting likely uninsured individuals in accordance with some embodiments;

FIG. 10 is a system flow diagram targeting likely individuals based on models of health conditions in accordance with some embodiments;

FIG. 11 is a system flow diagram targeting likely individuals based on models of health conditions in accordance with some embodiments.

DETAILED DESCRIPTION OF ILLUSTRATIVE EMBODIMENTS

Figure 1:
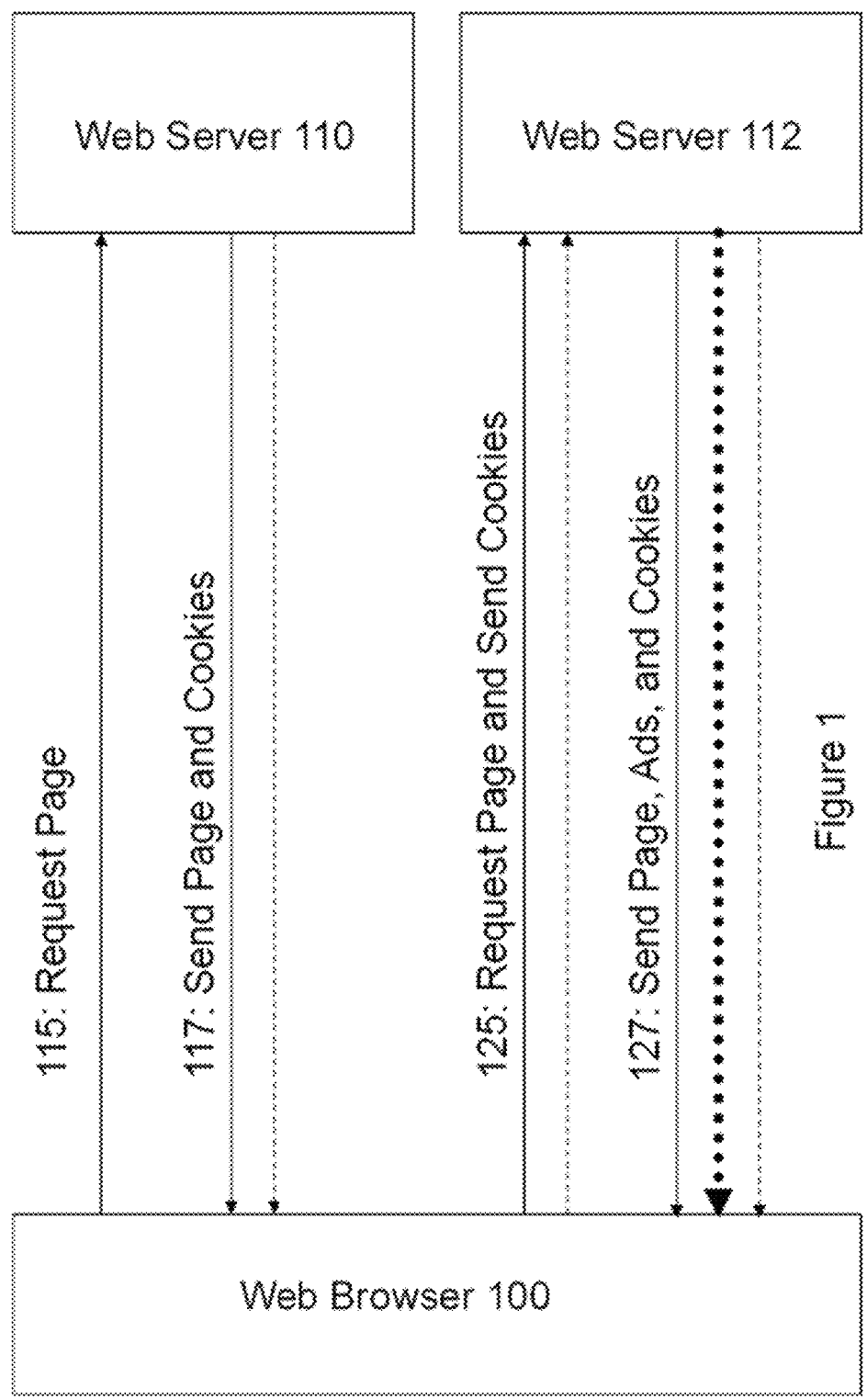
FIG. 1 is a timing diagram demonstrating the basic model for cookies for use with some embodiments of the present invention.

With respect to online advertisements that attempt to target individuals based on healthcare criteria, it may be desirable to avoid utilizing Personally Identifiable Information (PII) or Protected Health Information (PHI), or to protect this information by stripping connections between tracking identifiers or cookies and the PII or PHI. In some embodiments, steps are taken to remove any such association. In some embodiments, access to PHI and PII is restricted to trusted intermediaries, making it simple to allow third parties to utilize information correlated to demographic or healthcare traits of individuals or households, without those parties having access to any sensitive privacy information.

De-identification can be used to remove references to PHI or PII in tracking technologies used online. A common purpose of de-identification is to use healthcare data in larger increments, for research purposes. Universities, government agencies, and private healthcare entities use such data for research, development and marketing purposes. De-identification entails removing the 18 elements listed in the PHI section from the PHI data. (This is the safe harbor method for anonymization of data.)

De-identified Protected Health Information (DPHI) can be used to remove references to PHI in tracking technologies used online. This can occur by having PHI with the 18 identifying elements removed and replaced by a unique key. An "honest broker" (a registered, trusted intermediary) can possess the mapping from the identifying elements and the generated key. This can allow manipulation of information associated with individuals without giving the manipulator access to PHI.

Anonymization is a process in which PHI elements are eliminated or manipulated with the purpose of hindering the possibility of going back to the original data set. This involves removing all identifying data to create unlinkable data. De-identification under the Health Insurance Portability and Accountability Act Privacy rule occurs when data has been stripped of common identifiers, including:

Names
Geographic data
All elements of dates
Telephone numbers
FAX numbers
Email addresses
Social Security numbers
Medical record numbers
Health plan beneficiary numbers
Account numbers
Certificate/license numbers
Vehicle identifiers and serial numbers including license plates
Device identifiers and serial numbers
Web URLs
Internet protocol addresses
Biometric identifiers (i.e., retinal scan, fingerprints)
Full face photos and comparable images
Any unique identifying number, characteristic or code
Or obtaining the expertise of an experienced statistical expert to validate and document the statistical risk of re-identification is very small.

De-identified data is coded and can be linked to the original, fully identified data set, which remains and is kept by an honest broker. Links exist in coded de-identified data, making the data considered indirectly identifiable and not anonymized Coded de-identified data is not protected by the HIPAA Privacy Rule, but can be protected in an advertising ecosystem using the techniques discussed herein.

Embodiments can utilize off-line databases that are not exposed to the advertisement ecosystem and/or trusted intermediaries to correlate healthcare information to individuals without exposing PII or PHI in a manner that would violate HIPAA or other regulations, or might be otherwise objectionable to consumers. Privacy issues can be mitigated or resolved by preventing access to PII and PHI within the online advertisement ecosystem.

In one embodiment, when a web-user (e.g., a potential recipient of an ad) visits a website that recognizes her identity, such as a site she logs into (e.g., a bank or e-commerce portal), the website will send tag information (such as a tracking cookie) that contains, or is correlated to, demographic information, such as socioeconomic information, interests, location, etc., or that may be correlated to healthcare demographic information (HDI), such as whether a user is likely insured, whether that individual likely qualifies for certain health plans or benefits, whether the individual has certain risk factors that make an individual a likely candidate for procedures or health issues. HDI is information about the healthcare status of an individual, and may include an identification of whether she has health insurance, is eligible for a health plan, is in a population group that is at higher risk of certain diseases or other health conditions, when she last accessed medical treatment, etc. HDI can be provided by a health services provider, such as a doctor or pharmacy, as described herein, of by other reasonable sources.

As used herein, health services providers include both payor (e.g. insurers) and healthcare providers, such as doctors, hospitals, pharmacies, pharmacy benefit manager (that clear benefits when filling prescriptions), etc. While some concepts are disclosed with the exemplary party being a healthcare provider or an insurer, it should be understood that different health services providers may be used to provide HDI for use with embodiments.

This demographic information can come from a database that includes normalized HDI gathered from a plurality of sources. Once the tag has been dropped on the web-user's computer, such as in the cookie store, the tag can be used to identify the healthcare demographic of the user, generally without having to reveal the identity of the user, when the user visits other websites, such as content websites (e.g., foxnews.com, cnn.com, etc.). At these content websites, when ads are displayed, the website will collect the web-user's tag information (or direct the web-user's browser to send the tag information to a third party ad server). An ad server component can then determine whether a given healthcare-related ad (such as a flash animation, video, or banner ad) should be served to the web user at the content website based on the HDI associated with the tag. The tag can also be an identifier associated with the user's browser or device ID of a mobile device, such as an ESN, MEID, IMEI, or other unique serial number. In some embodiments, this can include a unique network address, such as a phone number, subscriber ID, IP address, or a MAC address.

Some HDI, such as gender, race, alienage, etc., may be excluded from consideration by certain embodiments, while other embodiments may include these classes of HDI. The term HDI should be construed broadly to cover demographic information about a consumer that may be collectively relevant to a message related to healthcare.

In some embodiments, any personal identifiable information associated with a user is removed from the cookie for privacy reasons.

Embodiments of the electronic and network-based advertising solution provide for selectively targeting consumers online, which provides improvements over conventional communications, such as direct mail, radio, or television which are untargeted to subsets of consumers, because the online advertisement is interactive and faster (e.g., certain aspects occurring in substantially real-time). Targeting may be to potential consumers or an identifiable segment of consumers. An identifiable segment of users may be defined by location and/or one or more demographics. These demographics can be rapidly changed or be used to define multiple segments of consumers to target with different ads. This allows faster and more targeted ad strategies than traditional ads and mailing. These techniques allow delivery in substantially real-time of more dynamic and vivid ads, including interactive ads.

Audience targeting may be accomplished in several ways. For example, embodiments of the present invention may include: (1) geo-targeting (e.g., customizing messages for local preferences down to the zip code+4, global phone, GPS coordinates, latitude/longitude, cable zone, etc.); (2) contextual targeting (e.g., placing ads in the context of articles that relate to a healthcare issue, such as articles about Obamacare, health insurance, or certain health conditions); (3) behavioral targeting (e.g., delivering ads based on users' interests and browsing activity that may correlate to interests correlated to certain health conditions or unmet healthcare needs); (4) site placement (e.g., reaching consumers in the context of a source they trust for their news and information when ads are strategically placed); (5) socioeconomic demographic targeting (e.g., targeting low income Caucasian individuals in areas with a high incidence of obesity or other health conditions that may correlate to socioeconomic patterns). Embodiments of geo-targeting can work off the idea of location, such as zip code or IP address if correlated to a location, such as by using available correlators that utilize ISP and hierarchical IP addresses to approximate or pinpoint the location of a user's internet connection. When a consumer connects to a website via a mobile device, the device's cellular location, serial number, ESN, MEID, IMEI, subscriber ID, or phone number can be correlated to the user's present location or to a certain billing address when the solution is partnered with the user's carrier. Embodiments of contextual targeting can also work off the idea of relevancy. The solution may scan web pages for key words, such as a person's name, an issue, a topic, etc. When the key word is found, an ad may be served on those pages. Demographic targeting may utilize a database of HDI, census data, and public records to associate the demographic information with the web browser the consumer uses by tagging the user once his identity can be ascertained at a website that knows his identity, such as a web portal like Yahoo or Google or other sites the user logs into, such as her bank. This tagging can be in the form of a tracking cookie, as explained below, or may be more passive from the user's perspective, such as associating the user's IP address, device ID, or other identifier with the user's HDI at a server, such that the user's HDI can be instantly identified when the user visits subsequent sites, such as a content site. This allows these sites to display healthcare-related advertisements or auction ad impressions to health related advertisers.

Embodiments of geo-targeting work off the idea of location, such as zip code or IP address if correlated to a location, such as by using available correlators that utilize ISP and hierarchical IP addresses to approximate or pinpoint the location of a user's internet connection. When a user connects to a website via a mobile device, the device's cellular location or phone number can be correlated to the user's present location or to a certain billing address when the solution is partnered with the user's carrier. In the instance of an identifier, such as a cell phone number or other unique ID from a phone, a carrier may present non-traceable personal information, such as a zip code, to ad partners, to assist in serving an ad impression. In some embodiments, a carrier can assist in serving messages in a given zip code (or other geographic area) without conveying which mobile devices meet the criteria. For example, a cellular carrier, or ISP, may present ads directly, and solicit requests from advertisers to display ads. The carrier could then apply filters internally to determine which devices to expose a message.

Geo-targeting can be a helpful tool for limiting ad impressions to individuals meeting desired criteria and may be accomplished in many ways, as described herein.

Using Cookies to Identify Consumers in a Demographic

In some embodiments, healthcare demographic information (HDI) can be associated with a consumer (and her computer or browser) by using tracking cookies. Cookies are text files that can be stored on a user's computer at the instruction of a web page and can later be accessed when the user returns to the same website or, in some cases, visits another website. Cookies allow a number of capabilities that enhance the stateless Internet experience for a web-user. A basic first party cookie allows users to log into a website once and then be remembered the next time they visit. For instance, the first party cookie enables electronic commerce sites to offer virtual shopping carts, allowing an online customer to select more than one item as they browse and paying by entering credit card information, only once, when they have completed their shopping.

Cookies can also be employed in some embodiments to measure and enhance the effectiveness of message delivery. For example, cookies can be used to keep track of which ads a user has been exposed to, so ads can be presented in the order and frequency the advertiser feels is most likely to interest the user. These types of cookies are often dropped and read by third party websites, such as ad exchanges, that are asked to select and verify that ads have been presented or to consolidate statistical information on viewership patterns. For example, when visiting content websites, often the ads will be served by a third party site via a redirection or inclusion, and cookies used for determining and tracking the advertisement are sent to the third party ad server. These ads can be served in many forms including static ads and JavaScript and Flash animations.

Advertising delivery traditionally involves several different players: (a) an advertiser who wishes to place one or more advertisements before prospective customers; (b) a publisher, such as a content website owner or service provider, that can offer an advertiser an audience; (c) an advertising agency or exchange that arranges advertising placements with publishers on behalf of advertisers for a fee; and, of course, (d) the consumer who is exposed to the ads. There is also a rapidly changing ecosystem of middlemen and information exchanges that offer software and services to assist in the tracking and targeting of advertisements.

Advertisers, who often pay large amounts of money for ad placements, want to track their ads and ensure these ads are targeted to the right consumer. In Internet advertising, there are additional methods by which ad exposures are measured and paid for, such as the number of viewers who click on or otherwise interact with an on-line ad. For these payment models to work, there must be some mechanism to collect information when users perform these actions. Cookies are widely used for this purpose.

One can think of the online advertising system as an ecosystem. Partnerships between sites and parties allow parties to drop cookies on a consumer's computer as she surfs the web and then view these cookies when she visits a site that displays an ad. These partnerships allow bidders (or at least a subset of the bidders) on an ad exchange to consider the information contained in the cookie (or correlated with the cookie) in making the decision of whether to bid to display an ad and the value of the impression of the ad. While a website displaying an ad may lack a formal relationship with another site that drops a cookie on the consumer's browser, relationships with third parties allow the correlation of information about the consumer and her cookie to ensure that ads can be targeted to the consumer. This ensures that the most relevant and valuable impressions are served to the consumer when she visits a content site. These third parties work together to drop a cookie on a consumer's computer, provide access to other parties to the information of the cookie, access multiple cookies when a consumer visits a content site, provide an ad exchange to allow parties to bid on ad placement based on the information those parties have discerned from one or more cookies on the consumer's browser, and provide hosting and serving of ads based on the ad selected by an ad exchange or by the content site.

The IETF has created a standard for cookies in RFC 6265, available at ietf.org and incorporated herein in its entirety. While the standard does not allow third party cookies, most browsers still allow these cookies, provided that these parties have a compact privacy policy. First party cookies are cookies set with the same domain (or its subdomain) in your browser's address bar. Third party cookies are cookies being set with different domains than the one shown on the address bar. Cookies can also be persistent, lasting on a consumer's computer for up to one year. These can be used to record behavioral information, such as websites visited recently and how the consumer came to visit the present site.

FIG. 1 provides a basic example of how a cookie can be used to track information about a consumer. Web browser 100 visits a first website at web server 110, such as a shopping site. To get content from the server 110, browser 100 sends an HTTP request 115 or the like. This includes information needed by web server 110 to retrieve and serve the proper site, such as a URL. In response 117, the web server 110 responds with the requested page, often along with one or more cookies. These can include simple first party cookies such that web server 110 can tell if the user of web browser 100 has visited before or has logged in before. These cookies can include information that can be shared with third parties, such as those with access to web server 112 to determine information about the user of browser 100, such as the type of webpage requested from web server 110, such as an article reflecting an interest of the user. These cookies can be persistent and remain on web browser 100 for months, until deleted by the browser or user. Subsequently, when the user requests another page from server 110 or another server 112, web browser 100 sends a request 125 and any cookies pertinent to the request, such as cookies associated with the same domain as the website requested. In response, server 112 responds with the requested page in response 127, along with any ads that have been selected in response to the cookies, such as an ad for something relevant to the interests reflected in the cookie previously sent to browser 100. Web server 112 can also respond with additional cookies. It should be noted that as part of the page returned in response to request 125, web server 112 may redirect web browser 100 to other sites or servers for a portion of the overall content, such as pictures or ads. As part of that redirection, the web browser 100 will send a related request and can send cookies related to that request to additional servers. Therefore, it should be appreciated that request 125 and response 127 can be iterated multiple times and involve more than one web server to complete the request and display a complete page to the user of browser 100.

Figure 2:
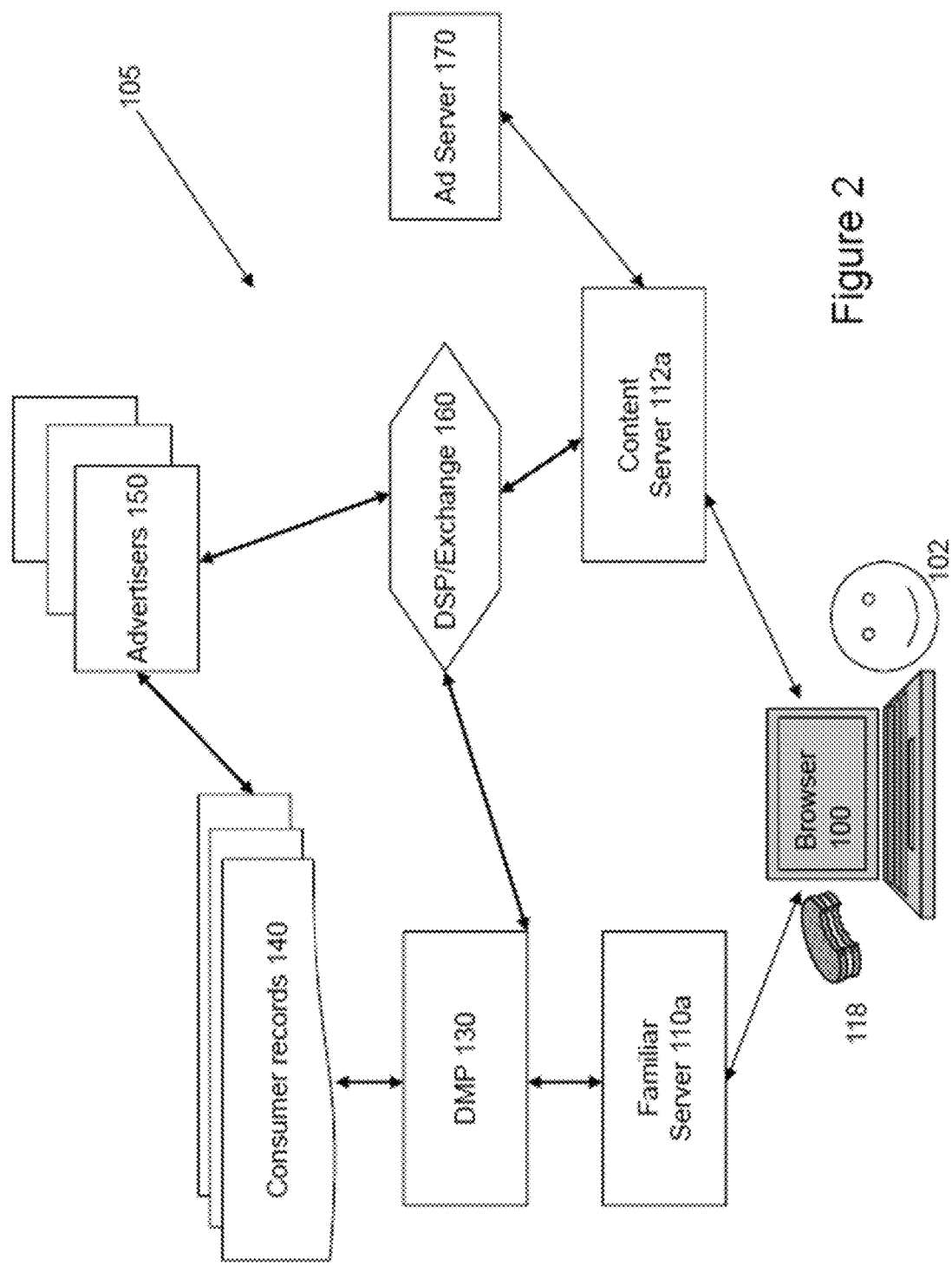
FIG. 2 is a system level diagram that illustrates the various interactions in the advertising ecosystem used by certain embodiments of the present invention.

FIG. 2 shows an ecosystem 105 for utilizing cookies across multiple web servers and web pages in accordance with some embodiments of the present invention. In this example, a user 102 using browser 100, accesses a website hosted by server 110a. This website and/or the server can be a website to which the user is familiar. For example, the requested page can be a website that includes a login component that allows the server 110a to discern the real-world identity of the user 102. For example, if the requested page is a page for online banking, the user will be asked to supply login credentials. The bank has access to certain personal information, such as address, name, phone number, etc. The bank may also receive cookie information that tells server 110a more information about the user 102, such as behavior information about past browsing or other cookies placed by previously visited sites.

Many sites that know the identity of the user 102 share certain information with partners in accordance with a privacy policy. In this example, the familiar web server shares the identity of the user 102 with a trusted partner 130. In this case the partner 130 is a Data Mining Provider (DMP) that assists companies, such as cookie partners that provide consumer records 140, in associating their cookies, which can often be proprietary, with users. In this example, the DMP 130 is given access to the user identity information, which it protects, and access to associative information provided by consumer records 140, which can include relational databases, flat files, and the like, and can be provided by third parties, including advertisers 150 or third party vendors that work to provide information that allow advertisers to target individuals meeting desired consumer criteria. In this example, the consumer records 140 includes a database or flat file that has HDI for a large segment of consumers that may be accessible to DMP 130. This HDI can include, amongst other information, information that may be correlated, as explained below, with healthcare demographic information. This may include, for example, gender, age, geography, ethnicity, non-identifiable health information, such as height, weight, how long it may have been since the user visited a doctor, whether the user is believed to have health insurance or not, smoking status, etc. The HDI can also include demographic information from surveys, census data, or third party providers to determine ethnicity, income level, credit scores, marital status, or other socio-economic information that may not be available from public records or consumer databases. This information, while not by itself directly linked to healthcare, can nonetheless be correlated and used by healthcare advertisers to target users in a meaningful way. In some embodiments, HDI may include whether the user has any known health conditions, such as a heart conditions or pregnancy. However, in some embodiments, this level of information is restricted and protected, such that no cookie information will be directly linked to known health conditions to preserve users' sense of privacy. The DMP, in concert with the records 140 related to the user 102 identified by server 110a, can associate the HDI with the browser 100 for use in subsequent advertisements.

DMP 130 can associate the HDI with browser 100 in numerous ways, including supplying cookies to browser 100 that include HDI directly as key-value pairs in encrypted or unencrypted form. Alternatively, the HDI can be associated with the browser 100 via a correlation with a substantially unique identifier that is sent to the browser 100. For example, a cookie or cookies 118 could include a key-value pair that gives the browser 100 a unique (or at least pseudo-unique) identifier that can be used to look up records later when another server receives the cookie 118. This cookie 118 can already reside on the browser 100 prior to visiting familiar server 110a, or be dropped by the server during the visit. In some embodiments, the cookies dropped onto browser 100 have had any personally identifiable information (PII) or protected health information (PHI) removed for privacy. That is, the user 102's name and address have been removed, but important non-personally identifiable HDI are included in some form, whether directly in the cookie 118 or included by association with an identifier contained in the cookie 118. In some embodiments, rather than an ID or cookie, the HDI can be associated with an ID uniquely assigned to the device, such as a device ID (ESN, IMEI, MEID, etc.) or a network address or subscriber ID.

In some embodiments, the HDI is associated with the user 102 in a restricted form, such as an ID that is associated with an entry, that is associated with the user of the device or browser, in an HDI database, or in other forms that make access difficult or impossible for parties to access the HDI unless authorized by the DMP 130 or provider of consumer records 140. This ID can be provided by the user's device, such as providing a cookie ID or other ID associated with the device. This enables the provider of consumer records 140 to license access to user 102's HDI during subsequent web browsing. This can provide the creator of records 140 alternative revenue streams or can give associated advertisers 150 a distinct advantage in bidding for impressions to serve to user 102. Advertisers can request serving ads to devices that have IDs that correlate to certain HDI, such as devices that correlate to HDI showing a user likely lacks health insurance.

The DMP 130 can communicate the association between cookie or cookies 118 and the HDI to an ad exchange 160, which includes a digital service provider (DSP) that acts as a bidding engine to help select appropriate ads based on cookie information. This allows the DSP to solicit bids for an ad impression when user 102 visits content server 112a.

When user 102 visits a content website (such as a news site) the content provider can make money by selling advertisements. To do this, a portion of the content webpage, such as an article, can include space for banner or flash animation advertisements. When browser 100 visits the content server 112a, the browser can send cookies or other IDs, including those dropped by server 110a or associated by DMP 130, as well as any other appropriate cookies. When determining which ad to display for the current impression, content server 112a can reach out to exchange 160, alerting the exchange that there is an impression available. Content server 112a can pass along any information about the user 102 (or any other consumer) to the exchange 160, including the IDs and/or cookies received and any user or behavior information about the user 102, including information about the current page being viewed. In some embodiments, cookies on browser 100 may include domain restrictions preventing them from being passed to content server 112a. When serving a content web page, content server 112a can redirect browser 100 to DSP 160 (or an affiliated server) to get content for the advertisement as the browser renders the webpage. In this manner, exchange 160 can obtain cookies related to demographic and behavioral information of user 102 directly from browser 100.

Once exchange 160 receives a request for an advertisement from content server 112a and information about user 102, exchange 160 can solicit bids for the impression from advertisers 150 via the DSP. Bids on the electronic exchange are nearly instantaneous, taking place in a fraction of a second based on rules set up by advertisers 150. In the case where browser 100 contains cookie information associated with the HDI of user 102, the DSP of the exchange 160 can use this information in the bidding process. The DSP has access to the HDI by synchronizing with the DMP when the cookie 118 was dropped on browser 100. Advertisers that are authorized to access the HDI associated with user 102 can use this HDI as part of the bidding process. An advertiser 150 can create multiple bidding rules for DSP 160 to follow.

For example, an advertiser may want to bid a fixed (or dynamic) price to display an ad for a health insurance plan to low income consumers that likely do not already have insurance that qualify for a discounted or subsidized plan. Accordingly, the bidding rule can be to bid a fixed price on the exchange for each unique user that has HDI that reveals "State=Iowa," "Income level=<$40 k" and "HasInsurance?=No." If the advertiser has an arrangement with the exchange 160 to consider cookie 118 and the associated HDI of user 102, the DSP will apply the advertiser's rule and place a bid on the exchange in the event that the HDI associated with the cookie of user 102 indicates that she is a low-income uninsured individual residing in Iowa. If this bid wins, the advertiser has won the right to serve the ad impression to user 102.

Exchange 160 can then direct content server 112a to display the ad selected by the winning advertiser, which server 112a may obtain from a third party ad server 170 that hosts the ad. This may also be accomplished in some embodiments by redirecting browser 100 to request a specified ad directly from ad server 170. Another cookie may be placed on the browser 100 to indicate that the user has been shown the selected ad. The ad server 170 or content server 112a can report to the exchange 160 that the ad has been displayed to the user 102 for payment processing.

Use Cases

In some embodiments, ads may target users in individual counties or states that meet certain other healthcare demographic criteria. For example, a zip code(s), or a longitude(s)/latitude(s), or a GPS location, etc. Further, the ad may micro-target to an identifiable group or segment with a location. This zip code or neighborhood level targeting allows more granularity.

This can be accomplished in a few ways. In some embodiments, when a user logs into a website or enters geography information associated with a location, a first server 110a may drop a cookie indicating this location. This cookie may be dropped based on the IP address of the browser 100, as a database may include a correlation of IP addresses to known locations or cable zones. When the user resurfaces at a content site at server 112a, one or more cookies that relate to geographic information of the user can be read by server 112a or an affiliated ad exchange 160. Advertisers can now bid on the user based on the geographic information. It should be appreciated that some advertisers will view the user receiving the impression as a general consumer of some non-healthcare goods and services and may base their decision on the same or other criteria in deciding whether to display an ad for a car, for instance. The exchanges allow healthcare ads to be bid on the same exchange as other ads.

A message may effectively be delivered to an IP address associated with a location (home) associated with that IP address. The electronic and network-based solution does not rely on personally identifiable information, but rather on all individuals in a finite geographic area that share a common interest, trait, characteristic, etc. In other words, rather than serving a message to an individual, an electronic and network-based advertising system can send it to an identifiable population with a given area (e.g., one to few). This can add value by allowing users to see relevant ad content based on geography and/or demographics. In some embodiments, cookies that can be correlated to demographic information, including location, are placed onto a user's browser, but the cookie contains no personal identifiable information, and can be used to trace a user's identity.

In some embodiments, the server 112a or ad exchange 160 can view the IP address of browser 100 and associate it with a location (home) associated with that IP address. This can allow serving of ads to users in a region without using tracking cookies.

In some embodiments, messages can be delivered based on location or HDI to target individual consumers, an ad may target individuals in a finite geographic area (e.g., city or state) that share a common interest, trait, characteristic, etc., deemed relevant to the healthcare ad. In other words, rather than serving an ad to an individual based on personal information or serving an ad to all visitors of a site, the electronic and network-based ad system can send an ad to an identifiable population with a given area (e.g., one to few). This adds value by allowing consumers to see relevant ad content based on geography and/or demographics.

Similarly, by using information, such as a cookie or IP address, that is not unique to a content site, messages can be shown to users of general interest. For example, content websites (e.g., those sites residing on exemplary server 112a) may be selected based upon, for example, traffic, location, interests, demographics, etc. Examples of site selection may include: search (Google, Bing, Yahoo!, etc.); Facebook; national news (e.g., New York Times, Wall Street Journal, Washington Post, etc.); local news, television, radio, weather; men and women (e.g., AllRecipes.com, MarthaStewart.com, etc.); sports; Email (Gmail); issues (e.g., healthcare, energy, economy, or industries of interest or importance) to name a few. Sites may be selected from one or more site lists.

The output of the electronic and network-based advertising system 105 may include a complete reporting package. For example, these may include impressions and clicks by site, and click through to a relevant webpage. Also, conversions, such as email, newsletters, sign ups, and the like may be tracked.

Ad Targeting System

Figure 3:
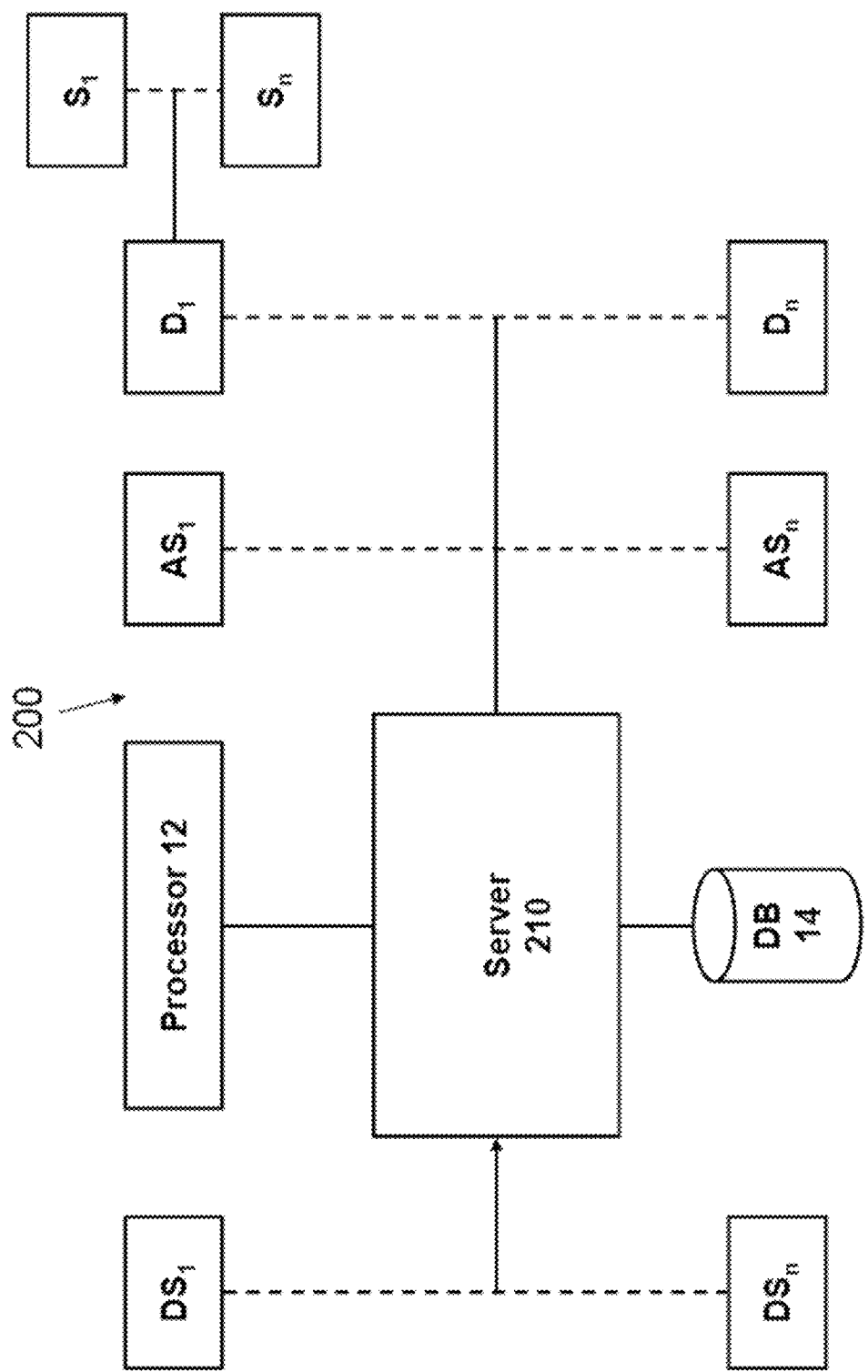
FIG. 3 is a block diagram showing features of an online advertising system in accordance with one embodiment of the present invention.

With reference now to FIG. 3, there is shown an ad targeting system 200 for implementing an embodiment of an electronic and network-based ad targeting system. As shown in FIG. 3, the system 200 includes data sources $DS_1$-$DS_n$, a decision server 210 that receives data and other information from the data sources $DS_1$-$DS_n$, an output for sending data and other information generated by the server to one or more ad or message servers $AS_1$-$AS_n$, and one or more demographic groups $D_1$-$D_n$. This topology allows scalability and multiple data sources and ad partners for targeting consumers. The consumer population and geographic regions may be further defined by one or more segments $S_1$-$S_n$. A segment includes an identifiable subset of consumers. The decision server may include a processor 12 and database 14 for processing and storing the data.

Figure 4:
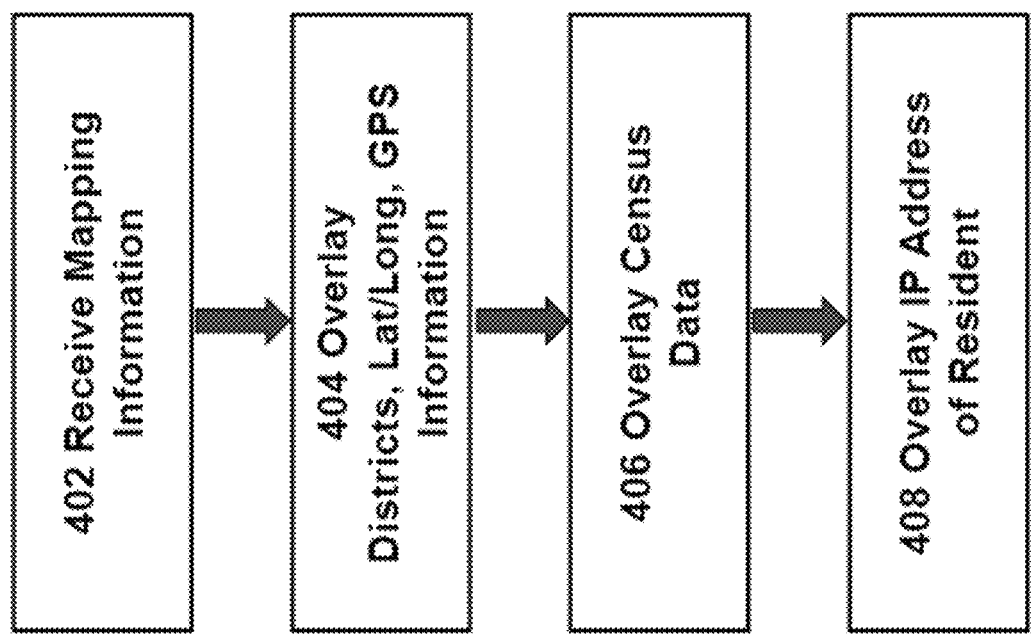
FIG. 4 is a flow chart showing an exemplary process for generating maps for geographic targeting of electronic advertisements.

The ad targeting system can include a map and map building function to include location, as shown in FIG. 4. At step 402, mapping information is received. The map is a visual representation of a geographic area of interest and includes location information. For example, country, state, county, city or town, street, house number, etc. Pre-existing mapping software may be used for mapping. In one embodiment, Google Maps or Bing Maps, web mapping service application and technology provided by Google or Microsoft, respectively, may be used for the map and location information. At step 404, location information may be overlaid on the map. This information may include, for example, zip code(s), latitude and longitude, GPS coordinate(s) information, cable zones, etc. At step 406, census data, including residence and household information, may also be overlaid on the map to identify and show where residents live within a geographic region. The geographic information may also include latitude and longitude for each selectable region. Further, the address of computing devices (e.g., the IP address) can also be collected and overlaid on the map. The IP address data may be collected from the geographic latitude and longitude data, which basically comprises an IP address map of every IP address in a given area.

The census data currently includes at its core approximately eight million census blocks. In some embodiments, the electronic network-based solution arranges the census data in larger blocks—e.g., 34,000 larger blocks that sit on top of the mapping, district, and base census information. In some embodiments, each larger block includes approximately 2,500 people. One reason for regrouping the census data is to make the solution and message delivery more manageable. In some embodiments, message targeting may be based on either zip code, cable television zone, or a Direct Marketing Area (DMA). A cable television zone is a unit that defines the individual households served by a cable television provider in a given geography. By using a DMA or cable zone, online ad campaigns can be combined with TV advertising to add value to traditional advertising packaging. DMA is a standard used in advertising and typically includes a predefined area around a power station (e.g., a 75 mile radius around a broadcast tower for television) or houses within a cable subscriber zone. By using a DMA, online ad campaigns can be combined with TV advertising to add value to traditional advertising packaging. This standard for broadcast targeting has also been adopted to some degree in Internet advertising and communications. Cable companies maintain they own DMAs, such as the DMA for a given municipality or nearby municipalities. However, because each cable services provider can control individual connections within its DMA (e.g., only providing active connections to subscriber drops that are in good standing), a cable services provider can select individual households, or groups of households, to display an ad online or via TV, based on the known physical location of each broadband connection.

Figure 5A:
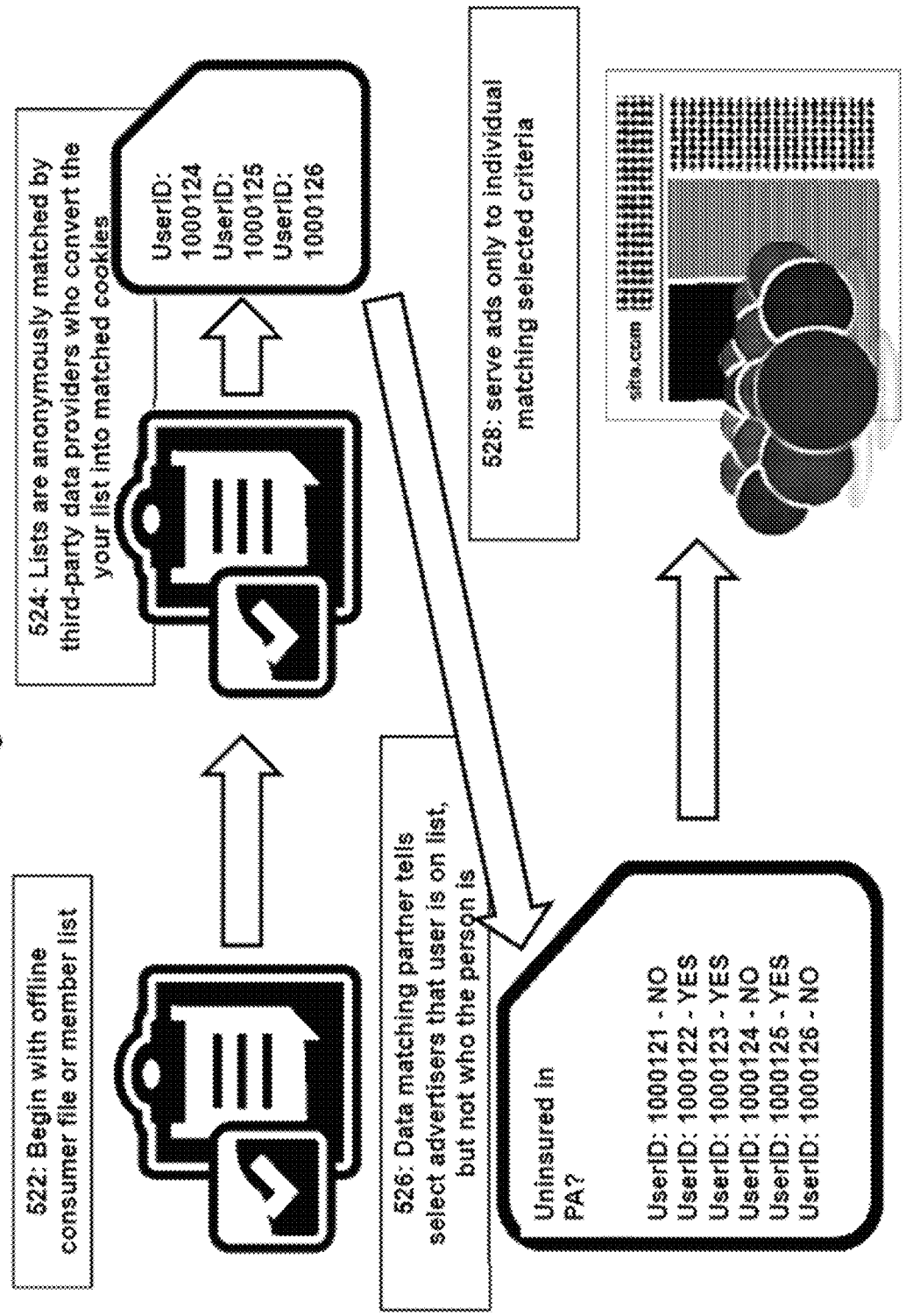
FIGS. 5A-C are flow charts for using an offline database and/or a national healthcare file to target individuals.

FIG. 5A shows a higher level illustration of the use of offline database information, such as matched healthcare information. To begin, the system takes an offline healthcare file or a member list at step 522. This data can be made part of a national healthcare file (NHF), the creation of which will be explained below. Once the NHF is created, a DMP or other party that knows the identity of a person browsing the web can be used at step 524. This DMP matches the list or NHF to the identity of the person browsing. This person can be called the user of the web browser. It should be appreciated that the user of a browser can include a household, as the actual identity of a person using a browser at any moment may not be knowable. Furthermore, the identity of the user may not be absolutely knowable, as a user can be identified by computer information and/or login information, which can be shared, stolen, or usurped. Accordingly, it should be understood that the identity of a user may refer to the likely identity of a user. The association of a browser to user information can be done anonymously such that the rest of the ecosystem, including a DSP and the supplier of the list, do not actually learn the identity of the web user. That is, demographic information about the user, or other non-personally identifiable information from the record, is matched to the ID of a tag, such as a cookie, that is provided or affiliated with the user's web browser or computer. The association of that ID or tag to the demographic information can then be shared with other parties in the ecosystem without revealing personally identifiable information. That is, the data matching partner, such as a DMP, informs other parties that the person is on a list or has certain demographic attributes, but does not reveal that person's identity as she browses the web. This allows advertisers to use that association to easily identify whether a person meets demographic criteria and target ads to them without knowing that person's identity. This process is shown in more detail in FIG. 5B.

The data matching partner, such as a DMP, informs other parties that the person is on a list or has certain demographic attributes, but does not reveal that person's identity as she browses the web. This allows advertisers to use that association to easily identify whether a person meets demographic criteria and target ads to them without knowing that person's identity. In some embodiments, this step includes placing a cookie on a user's machine having a unique ID that can be looked up by advertising partners to reveal HDI, such as the user's likely insured status, but not PII. In some embodiments, each browser for which a DMP can find an entry in the NHF receives a cookie that the DMP associates with the entry in the NHF. In some embodiments, the DMP creates a new entry for the cookie ID, and correlates it with a group of non-personally identifiable demographic information, such as location and age.

At step 526, when a user's browser visits a content website associated with a data matching partner having access to the cookie, the data matching partner (DMP) will inform the ecosystem that a browser has a cookie associated with the NHF. In some embodiments, the data matching partner performs a step to apply an advertiser's selected criteria from the NHF to create a list of cookie IDs that match, before a user's ad impression becomes available for bidding. The advertiser that wishes to then bid on the ad impression to serve an ad needs only to check the predetermination by the DMP. In some embodiments, the DMP can check whether the user matches the criteria for candidates of the ad by looking up demographic information from the cookie ID at the time of the ad impression. In these manners, a data matching partner allows ads to be sent to users based on whether that user's demographic information matches an ad's filter criteria, without telling the advertiser who the user is, or delivering any personal information. For example, in the example shown in FIG. 5A, uninsured users residing in PA are matched by the data matching partner. A vendor wishes to bid on an ad impression for impressions that meet the message criteria to selectively display the advertising message. The DMP can maintain a list of all cookies that match the criteria. At step 528, when individuals match the list of cookies meeting the filter criteria, a vendor can bid on the advertising impression available for a browser having that cookie and visiting a content website. At that time, a message can be served by a content site. This process is shown in detail in FIG. 5C.

Figure 5B:
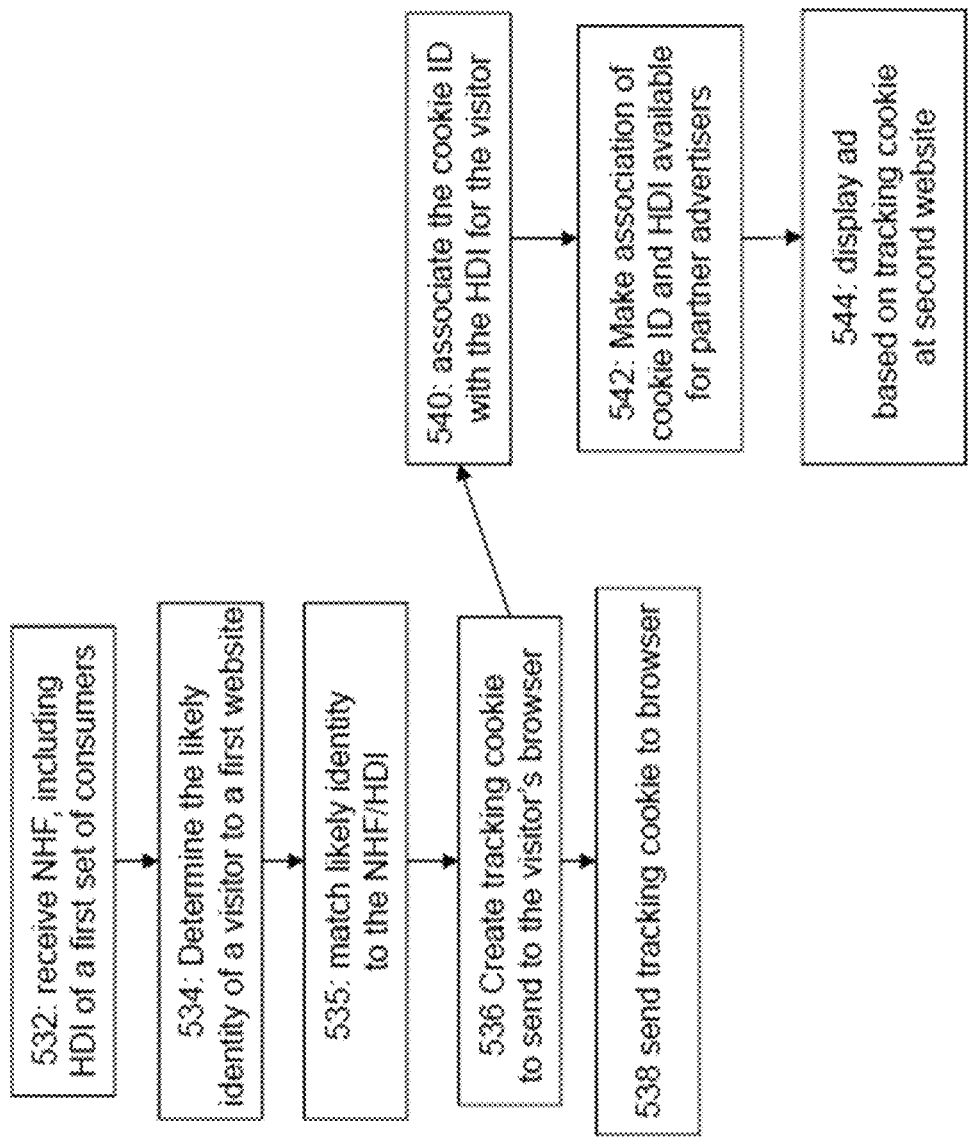

As shown in FIG. 5B, a DMP can place a cookie on a user's browser to allow subsequent advertisements, to be displayed to the user. At step 532, the DMP receives the NHF or other records that associate the identity of individual consumers to the HDI for each consumer. At step 534, the DMP determines the likely identity of a visitor to a first website. For example, the DMP can determine based on login information, the likely identity of a user, such as his name and address. At step 535, the identity of the user visiting the first website is compared to the NHF or other records to match records to the user at the website. This allows an association of the visitor with the HDI in the records.

At step 536, the DMP creates a tracking cookie to send to the user's browser, who is visiting the first website. This cookie can be used to associate the user's browser to the HDI of the user (or a subset thereof). This subset of HDI can include any HDI, but in some embodiments, intentionally excludes any PII or PHI to facilitate compliance with legal requirements, such as HIPAA requirements. This cookie includes a unique ID that can be used to look up the associated HDI when the cookie appears at a second website. In some embodiments, the identity (or other PII) is not associated with the cookie ID. Therefore, the cookie cannot be used to determine the identity of the user. It will be appreciated that some embodiments could be contemplated that include such an association—where allowed by law or otherwise not objectionable. At step 538, the tracking cookie is sent to the browser of the website visitor.

At step 540, the DMP creates an association between the cookie ID and the HDI of the user. This can include a record in a database. At step 542, the association of cookie ID and HDI is shared with partner advertisers. This can include sharing a database with partners that include a record for each cookie ID and the HDI as fields in the record. This can include sharing access so that partners can run queries for IDs that match selected criteria.

At step 544, partners can use the cookie ID of a browser to look up the associated HDI when the tracking cookie appears on a browser visiting at a second website. Then, an ad message can be displayed to that visitor at the second website.

Figure 5C:
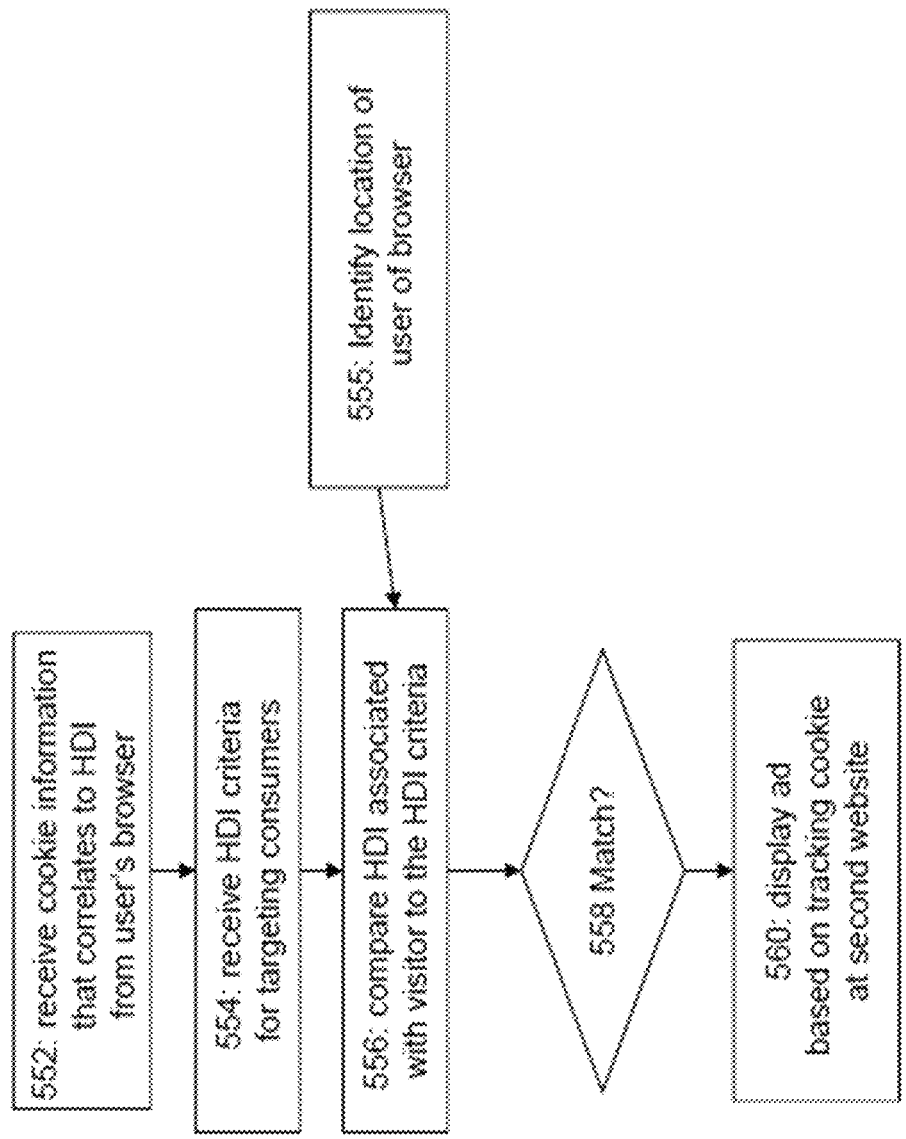

As shown in FIG. 5C, at a second website, such as a content website, an ad partner can display a message to a consumer that visits that website based on cookie information or the location of the browser of the consumer. At steps 552, if the browser of a visitor includes a cookie, such as that discussed with respect to FIGS. 5A-C that can be correlated to HDI of the browsing user, the cookie is sent to the second website. This cookie can include cookie information, such as a unique cookie ID that correlates to associated HDI, as described in step 540, which may previously have been performed by a DMP at a first website. This cookie information can be sent to a matching partner, such as a DSP. The HDI associated with the cookie can be called a first set of HDI. This can be obtained by looking up the record for the cookie on the visitor's browser.

At step 554, the second website (or DSP) receives the desired HDI for targeting consumers. This desired HDI criteria can be called a second set of HDI. It may be provided by an advertiser and include attributes of targeted consumers, such as uninsured consumers.

In some embodiments, at step 555, the second website identifies the current location of a user browser visiting the website. This can provide alternative means to match a visitor to the targeted consumers identified by the second set of HDI. For example, the IP address of the browser or phone number of a mobile device can be used to associate the visitor with residing in a certain desired region (such as an area where an insurer is authorized to sell insurance). In some embodiments, where a user is browsing via a mobile device, such as a smart phone, equipped with GPS, the GPS can be used to determine location, including the current proximity in which the mobile device is located. This can also be considered part of the first set of HDI, or an alternative set, in some embodiments.

At step 556, the first and second sets of HDI are compared. In some embodiments, only visitors that match all selected HDI in the second set will be candidates for receiving an advertising message. In some embodiments, HDI can be used to choose a bidding price rule for bidding on an ad impression. At step 558, if the first set of HDI (the HDI associated with a visitor) matches the second set of HDI (the HDI criteria chosen by an advertiser for displaying an ad), an ad impression on the second website matches the ad message criteria. In some embodiments, the result of the matching step will cause a bid to be placed on an ad exchange to bid a determined price for displaying the ad message to the user visiting the second site. In some embodiments, there are degrees of matching that reflect whether the two sets of HDI are a complete or partial match. The degree of the match can affect the determined price to bid on the ad impression.

At step 560, an ad message is caused to be displayed to a user via well-known means for internet advertising, such as including the ad in the data sent to a browser when a web page is loaded. In some embodiments, step 560 only occurs if a bid is successful on an ad exchange. It can be said that the message is displayed based on the result of the comparison step 558 (e.g., if no bidding occurs or if the bid triggered by the match is successful on an ad exchange.)

Figure 7:
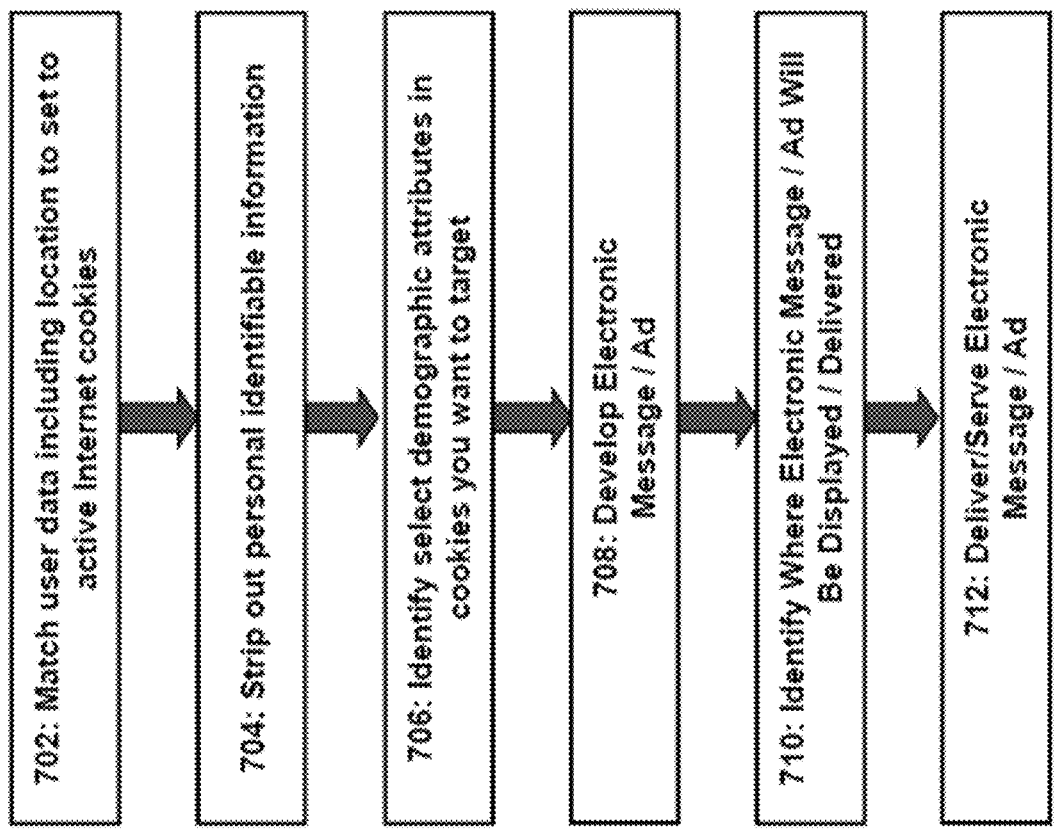
FIG. 7 is a flow chart showing exemplary processes for processing a request for targeting delivery of an online advertisement in accordance with some embodiments of the invention.

FIGS. 6 and 7 show exemplary processes for generating and delivering targeted electronic and network-based advertisements. In some embodiments, targeting may be one to few based on geography. In some embodiments, targeting may be one to few based on geography and demographics. As shown in FIG. 6, at step 602, a request from an advertising client, such as an insurer or medical practitioner, may be received. At step 604, the criteria (e.g., geographic and/or demographic) to be solved for are identified. At step 606, based on the criteria, consumers will be identified by the method using the mapped data/information and the parameters of the ad request. The result of this step can be conveyed to a developer of the message via a heat mapping tool, explained below. In response to a query of demographic criteria, the heat map tool can show visually the segment of the households that match the selected criteria. In some embodiments, a developer of a message can quickly guess-and-check between steps 604 and 606 iteratively to find the right mix of criteria for the message. An advertisement is developed. For example, the content, format, layout, message, etc., are determined. The website(s) to which the online ad will be delivered will be identified or selected. In some embodiments, the website selected to be used for the ad can be a website that is selected for a high incidence of traffic meeting the selected HDI criteria, such as a local newspaper. This selection can be automated by running a comparison of the selected criteria of individuals who should be shown the ad to traffic statistics from a partner website. This statistical information can be provided by a DSP.

At step 608, once demographic criteria are decided, a message is developed. At step 610, the website(s) to which the online message will be delivered will be identified or selected. In some embodiments, the website selected to be used for the ad/message can be a website that is selected for a high incidence of traffic meeting the selected HDI criteria, such as a local newspaper. This selection can be automated by running a comparison of the selected criteria of individuals who should be shown the message to traffic statistics from a partner website. This statistical information can be provided by a DSP.

In some embodiments, once a message is developed, bidding for delivery of the message on online ad exchanges can occur, as many times as the message will be served.

At step 612, real-time bidding may occur to determine a price for serving the ad as part of a single or multiple advertising impression packages on a website, such as a new page. If a price is agreed upon (e.g., the advertiser wins the bid to serve an individual impression in a real-time auction or an agreement before the site begins displaying ads), the advertisement is delivered to a user's browser at step 614. If a price is not agreed to, then no action is taken, and the message is not served at step 615. Step 612 can then repeat for each advertising impression that matches the selected criteria and the ad is not served. The ad may be delivered, for example, over the Internet, via HTTP. With advertisements, instructions and graphics/audio may be delivered to or pre-stored on an advertisement server to deliver the advertisement. The intermediate steps are not required to be performed in any particular order.

FIG. 7 shows another process for micro-targeting to match demographics (e.g., healthcare demographics) in the various data sets to active Internet cookies. This type of targeting is one to one. As shown in FIG. 7, the process may include matching the data set in the NHF or the preselected criteria to active Internet cookies on browser 100 (step 702). PII may be stripped out at step 704. At step 706, selected demographic attributes/HDI may be identified in the cookies that will be targeted. At step 710, an electronic ad may be developed. At step 712, the site is identified or selected for serving and displaying the ad and the ad may be delivered/served. In some embodiments, cookies may be matched to data, such as geographic or HDI data. In some embodiments, cookies are anonymous and do not contain any personally identifiable information.

The use of cookies in certain embodiments allows for serving ads one to one based upon demographic information revealed in the cookie. As explained throughout, a cookie may be dropped or installed on a user's personal computing device when that person visits a particular site. The cookie data and this on-line tracking may then be used to identify/ define demographic(s) for the targeted serving of ads. The system and method may monitor a site to wait for the person with certain demographics to show up (e.g., visit the site). Real-time bidding in the display or advertising business may ensue in which, if a bid is won, an advertisement is displayed. For example, a decision tree may be included to allow real-time bidding on an ad unit on a website (e.g., Weather.com). If the right person (based on HDI) in the right location (geography) is identified, a real-time bidding process determines whether an ad will be served. Healthcare-related ads may be bid against, for example, ads for personal care products.

Embodiments of the invention may use different cookies. For example, tracking cookies and re-targeting cookies. In some embodiments, the cookie is a tracking cookie and is merely used to identify that a user has visited a particular site. This type of cookie may be used for list building so that the next time an ad impression is available for this user, ads may be chosen more efficiently.

FIG. 8 shows exemplary data sources $D_1$-$D_9$. Data and other information included in the data sources may be used for data driven advocacy. The advertising system is used to match a message, target and delivery channel for maximum efficiency in an online ad campaign. As shown in FIG. 8, the data sources may include a healthcare data source $D_1$, a consumer data source $D_2$, a social data source, $D_3$, a demographic data source $D_4$, an economic data source $D_5$, an intent data source $D_6$, a lifestyle data source $D_7$, a behavior data source $D_8$ and a geographic data source $D_9$. The healthcare data source $D_1$ may include, for example, information such as whether an individual likely has insurance, age, gender, employment status (such as whether she works for a large employer that provides insurance or a small employer that does not), income level (such as whether an individual qualifies for a subsidy), known or modeled conditions, and any other medical history data that may be available. In some embodiments, this data source may include sensitive PHI that may be stripped out before utilizing the data with the advertising ecosystem. The consumer data source $D_2$ may include, for example, information such as credit lines—premium/specialty, household income/wealth, investor capacity, etc. The social data source $D_3$ may include information derived from a social media website such as Facebook or LinkedIn. The demographic data source $D_4$ may include, for example, information such as age/life style, occupation, presence of children, ethnicity, household composition, etc. The economic data source $D_5$ may include, for example, information such as home value, home equity, financing type, net worth, head of household income, and the like. The intent data source $D_6$ may include, for example, information such as search term histories, website browsing patterns, and the like. The lifestyle data source $D_7$ may include, for example, information such as purchasing patterns, online activity, market channel responsiveness, affinity groups, etc. The behavioral data source $D_8$ may include, for example, information such as charitable giving, employer, avocation, interests, etc. The geographic data source $D_9$ may include, for example, zip codes, latitude/longitude, census blocks and tracts, cable zones, DMA and radio zones, etc.

Embodiments may be used beyond displaying ad impressions on the Internet. Some embodiments are suitable for use with selectively displaying other ads, such as television commercials to targeted consumers. Whereas traditional broadcast television limits the ability to target individual viewers because content, including commercials, is broadcast to all viewers in a cable zone or broadcast area, the present invention can work with cable systems to distribute content to individual households.

In some embodiments, the NHF content can be used by an IPTV system. IPTV allows television content to be transmitted across an IP network, such as a cable company's subscriber network to individual IP-enabled devices, such as set top boxes. IPTV can allow on-demand or live TV content to be selectively sent to individual subscribers. Content can be distributed to users via IP unicast or multicast streams. A set top box can be configured to selectively receive one or more of these streams. For instance, for on-demand content, a set top box can selectively receive a unicast stream that includes the on-demand TV show and any commercials selected to be displayed to the subscriber. The set top box can communicate with one or more content servers to request a stream in response to a user selection, such as selecting a channel or movie via a remote control. Similarly, for live TV, each channel can be transmitted as one or more multicast streams. Multiple households may view the same multicast stream or different streams, (or unicast streams). As used herein, a set top box is any devices that may access an audio or video stream and display the content to a user, such as display via a television. This may include cable boxes, videogame consoles with suitable software, digital media receivers, etc. These will be understood as examples of end-user electronic devices that can consume content and display an ad to a user of the end-user electronic device, which may be suitable for use with some embodiments.

Furthermore, in some embodiments, multiple streams may be used to create a viewing experience for a viewer. For instance, live TV may be transmitted to multiple households via a multicast stream. Then, when commercials should be displayed, the set top box may receive another multicast or unicast stream. This can allow different households viewing the same TV stream to be presented with different commercials. These embodiments may identify the set top box by a unique ID or IP address that a cable/TV provider can associate with the household. This can enable the cable/TV provider to target individual households based on the subscriber's set top (or other electronic devices that the subscriber uses to access video content). It should be appreciated that some embodiments may utilize non-IPTV distribution methods where a cable provider has a network suitable to selectively send content to electronic devices (e.g., set top boxes) associated with individual households or clients.

In embodiments that have a means for selectively sending ads to households and set top boxes, the systems and methods used herein can be used to selectively target these households using the content of the healthcare file. Cable/TV providers can partner with entities that utilize the healthcare file to select households based on healthcare demographic information. Once the households are selected using the methods described herein, the cable/TV provider can use its distribution network to serve selected ads to set top boxes (or other electronic devices) for those selected households. Similarly, the cable/TV provider can receive information from the healthcare file that allows the provider to populate subscriber records with information from the healthcare file. For example, the subscriber records of the cable/TV provider can include entries for subscribers that contain healthcare demographic information that corresponds to the subscriber's household. The cable/TV provider can then allow advertisers to select criteria for selecting which households to target with an ad. Those households matching the set of healthcare demographics can receive the ad via one or more set top boxes during regular commercial slots or via any other advertisement method, such as banner ads displayed to a user while displaying a menu or schedule.

It should be understood that ads may be presented to users of any suitable electronic device, such as a computer accessing a website, a set top box displaying television streams to a TV, mobile phones accessing a network, and the like.

Moving Healthcare Information Online without Violating Privacy

A first example of the use cases that may utilize HDI to target consumers relevant to a certain product or service offering includes identifying those consumers that likely do not currently have health insurance, but who qualify for a given insurance plan. Currently, there is no online accessible database that identifies all individuals that have insurance, or those individuals that do not have insurance. Insurance providers are unlikely in the near future to provide this information in a publicly accessible way. One desirable HDI attribute that can be included in the NHF is an indication of an individual's likely insurance status. This attribute can be created as described below. The accuracy of this attribute can be improved with time as more off-line data sources are utilized and as those off-line databases change.

Other HDI attributes may also be desirable for assisting health plan advertisers to target relevant consumers that may be interested in the offered health plan. For example, under new healthcare legislation, pre-existing conditions must be covered under an insurance plan. An insurer may wish to target a certain insurance plan at those individuals that are believed to have a pre-existing condition. This may allow an insurer to target a plan to the needs of that individual. Similarly, an insurance plan may offer a discount (or receive a subsidy) to employees of small businesses, which may not be required to offer insurance to individuals. Individuals that are employees of small businesses may also be more likely to not have employer-provided health insurance, which may make these individuals likely consumers for insurance plan offerings. On the other hand, web users that are employees of large corporations may already have insurance, and ads targeted at these individuals may be wasted ad impressions. Under recent healthcare laws in the United States, in individual may be insured under her parent's health plan until the age of 26. Accordingly, the age of a consumer may be relevant for selecting whether or not to display an ad impression to that individual. Income levels of users may also be relevant to identifying individuals that may qualify for subsidized insurance plans.

One way in which HDI may be created for individuals without exposing sensitive PII or PHI is to utilize a trusted or honest broker that may act as an intermediary between members of the healthcare community that have access to identity information and databases of consumer attributes for individuals that have been treated by members of the healthcare community. These trusted brokers may correlate information in the consumer profiles and healthcare profiles of these individuals. Certain non-sensitive healthcare information may then be added to consumer profiles of these individuals, such as an indication of whether the individual likely has health insurance or not. In some embodiments, certain healthcare information may not be considered PHI, but may be considered too sensitive to include in a consumer profile. This may include, for example, the presence of a pre-existing condition. Instead, sensitive information may be modeled as described below with respect to certain embodiments. This may allow the advertising ecosystem to utilize certain consumer attributes of individuals as indicative of a likelihood that a user has certain healthcare criteria. For example, consumer attributes of individuals with erectile dysfunction may not directly indicate that this individual has erectile dysfunction, as this indication may be objectionable. However, a healthcare advertiser looking to identify consumers most interested in an erectile dysfunction treatment may utilize the consumer profile to identify those individuals that are within a target demographic that is most likely to be interested in erectile dysfunction treatments. An indication that an individual is a member of such a demographic may be included in the NHF. For example, an individual over the age of 65 who is married and interested in certain activities, such as golf, may be identified as a target demographic for erectile dysfunction treatments, using the systems and methods described below. Cookies or other IDs associated with these individuals' computing devices may correlate with HDI that indicates that individual's likelihood of being interested in erectile dysfunction treatments. Similarly, individuals of a certain weight, age, ethnicity, geography, etc., may have a higher likelihood of having certain conditions, such as heart disease. This likelihood may be contained in the HDI associated with cookies on those users' browsers.

FIG. 9 shows an exemplary system and method for facilitating targeting consumers who are uninsured. National healthcare file (NHF) system 750 may be a client or server system that facilitates creation and utilization of healthcare demographic information (HDI). In this example, NHF 750 partners with various other entities to gather information about the insurance status of individuals, while preventing access to sensitive PII and PHI. PHI may be treated with stricter privacy then PII. For example, it may be important to prevent DSPs from accessing PII, but it may be important to prevent DSPs and other parties involved in the matching process from having access to PHI, due to privacy law. A first party that may be used to create an uninsured list is a matching agent 752. Matching agent 752 may be an entity that has access to certain consumer and demographic information about a plurality of individuals. For example, matching agent 752 may be a partner that has access to a large file that includes information about millions of online users. This information can be gathered from multiple sources, such as websites the user uses, websites that know the user's identity, off-line information, such as census information and public records, or other sources that may provide useful information that may correlate consumer attributes to individuals. NHF 750 may send a consumer file to matching agent 752. This consumer file may include the names or other identifying information of a plurality of Internet users. This may be, for example, a census file and may include publicly available information that includes PII. In some embodiments, the consumer file contains millions of entries and may attempt to include entries for every Internet user in the country or other geographic region. Matching agent 752 may then add a healthcare ID (HID) to each record in the consumer file. The HID may be a unique ID that is assigned to each individual, and may be used to correlate healthcare information from other sources. The HID may be used by other partners to refer to individuals, without exchanging PII or providing access to PII to these partners. The HID may be created as a hash of PII or by any other reasonable method to generate a unique or pseudo-unique identifier. Similarly, the HID may include PII or a non-human readable version of PII. In some embodiments, the HID does not explicitly contain any PHI.

Once the HID is added by matching agent 752, the consumer file may be sent to a de-identification agent 754. A de-identification agent (DID agent) acts as an honest broker that can be trusted with information that contains identification information. The DID agent is responsible for correlating information pertaining to individuals and then removing personal identifiers, thus reducing the risk that the correlated information may result in a breach of an individual's privacy. The DID agent can maintain a local association between correlated information and PII or PHI. This information, however, is generally not shared with other parties, allowing the honest broker to treat this identification information securely. DID agent 754 will use this consumer file, along with information received from the healthcare system, to identify individuals that likely have insurance and individuals that likely do not.

One or more healthcare providers may supply DID agent 754 with information regarding the insurance status of individuals. This information can come from doctors, pharmacies, health services providers, insurance companies, etc. Currently, there are industry partners that are responsible for maintaining anonymized patient data. This data may be generated in any number of ways. For example, when a patient visits a doctor and receives a prescription, that patient or prescription may be assigned a number. This may be reported to a patient data repository. When a pharmacy later fills that prescription, the patient data repository may correlate the number of that patient or prescription, encrypt this information, and determine that that patient has filled that prescription. This information may be gathered, for example, when a pharmacy calls a clearinghouse to seek insurance information for reimbursement for filling a prescription. A patient data repository can aggregate this information and act as a clearinghouse for these transactions, serving a purpose for the insurance industry, but also gathering data that may be anonymized about patient behavior. PHI provider 756 may be any entity that provides information that includes PHI. PHI provider 756 may include doctors, pharmacies, pharmacy benefit managers, clearinghouses for patient transactions, or the like. Because PHI provider 756 has access to sensitive PHI, this entity generally treats this information as highly sensitive, and generally does not provide this information to other parties. However, because DID agent 754 acts as a honest broker, PHI provider 756 can legally and ethically provide PHI information to this agent in a privacy-compliant manner. Rules or law may govern what DID agent 754 may do with this information. In this example, DID agent 754 is responsible for stripping out any PHI information before sending information to other parties.

PHI provider 756 can utilize information about patient transactions to generate a list of individuals that likely have insurance. This list may be generated in any reasonable manner. In some embodiments, this list includes those individuals that have access to the healthcare system in the last five years, or any other reasonable period of time. Individuals that have filled prescriptions that have resulted in insurance reimbursement during this period likely have insurance at the time and likely still do. Similarly, individuals that have not accessed the healthcare system using an insurance provider or received insurance reimbursement likely do not have insurance. It should also be appreciated that insurance providers may eventually provide lists of insured individuals that may be provided to DID agent 754. This likely insured list can contain PHI and should be treated as confidential. PHI provider 756 may provide this likely insured list to DID agent 754, who may ask an honest broker to maintain the confidentiality of this information. Upon receiving the consumer file in a likely insured list, DID agent 754 can remove or suppress the individuals on the likely insured list from the consumer file. This may be accomplished by matching PII or HID information from the consumer file to corresponding information in the likely insured list.

In this example, DID agent 754 intrinsically suppresses PHI in creating a list of likely uninsured individuals because individuals' PHI in the likely insure list are removed from the consumer file. Only information in the consumer file, such as PII and/or HID remain. DID agent 754 can add a proxy key to this list or each entry in this list. This proxy key may be useful for record-keeping within the DID agent, and may provide a non-human readable method of maintaining an association between individuals in the likely uninsured list and PII, which is maintained only by the DID agent. A likely uninsured list that contains individuals identified by HID and a proxy key, without PII or PHI, is returned from DID agent 754 to matching agent 752. This allows the matching agent to create cookies that may be associated with individuals on the likely uninsured list without associating any personally identifiable information with those cookies. This may allow cookies to enter the advertising ecosystem that allow individuals to have their insurance status associated with their browser without violating any legal or ethical privacy rules. These cookies may be used by the advertising ecosystem to allow insurers to bid on ad impressions to display to individuals that likely do not currently have insurance.

To accomplish this, matching agent 752 takes the likely uninsured list and creates a cookie pool. Each individual in the likely uninsured list has a cookie that may be associated with an individual through a non-human readable identifier, such as the HID or proxy key. These cookies may also utilize existing cookies by associating the insurance status with cookies used for other consumer purposes. These cookies may then be provided to DSPs 758. DSPs 758 may then utilize these cookies as any other cookies in the advertising ecosystem. Once DSPs 758 have access to the uninsured cookies, NHF provider 750 may utilize these cookies to sell access to this cookie information allowing partners using the NHF to target digital ads to likely uninsured individuals. NHF provider 750 may lease access to advertisers to this cookie information.

FIG. 10 shows an embodiment whereby the national healthcare file may allow advertisers to access information about likely health conditions of consumers using existing infrastructure. Currently, it may be legally or culturally objectionable to allow advertisers to access information that identifies those individuals that have a certain health condition. Similarly, due to restrictions on PHI, this information may not be readily available. In some embodiments, where utilizing information about existing health conditions of individuals is not objectionable, this information may be directly provided by healthcare providers, by insurers, or by utilizing an opt-in patient framework, cookies may be created (similarly to those cookies in FIG. 9) that identify individuals having certain conditions. However, to the extent this information is not available or use of such information might be objectionable, disease modeling may be used. FIG. 10 shows the exemplary information flow between a plurality of partners to provide correlated disease models that may allow consumers to be targeted by advertisers based on a likelihood, rather than existing knowledge, that an individual may have a certain health condition or as a candidate for that health condition.

The disease modeling system shown in FIG. 10 allows health services providers to provide information about health conditions of the plurality of individuals to a DID agent that acts as a trusted broker. This information will not be directly used in the advertising ecosystem. Rather, the DID agent will receive consumer information or other demographic information from other parties, allowing the DID agent to match those consumer traits to the health conditions. All identifying information about individuals involved in this correlated study may be removed, allowing the DID agent to communicate with a modeling partner to provide a wealth of data points that allow the modeling partner to do a population-based analysis to determine if certain consumer traits are correlated with certain health conditions. For example, information about weight, obesity, and heart conditions for a plurality of individuals may be provided by the healthcare system. Meanwhile, information about consumer behavior including the types of food products purchased, existence of gym membership, income level, age, interest in certain sedentary hobbies, brand loyalty, etc., may be provided by one or more consumer tracking databases that are utilized currently in the advertising ecosystem to target consumers based on these traits. Individuals' health information may then be correlated with this consumer information. Trends may become apparent by doing population-based analysis. A modeling partner may take information about thousands or millions of consumers and notice that there is a trend between the risk of being overweight, obese, or having heart conditions and a correlation to certain consumer behavior or demographic information. By noticing this trend, the modeling partner may assist an NHF provider in identifying certain consumer attributes that advertisers hoping to target certain medical conditions should look for. By identifying these correlations, the NHF provider can enable advertisers to target consumers that may have or may be at risk of having certain health conditions based on existing consumer cookie information already in the ecosystem.

For example, a service hoping to advertise participation in a weight-loss study or a weight-loss plan may wish to provide ad impressions to overweight individuals. By utilizing the correlation provided by the NHF provider, the advertiser may be able to identify individuals based on cookie information where these cookies identify certain consumer behavior, such as lack of gym membership, age, past buying behavior involving high caloric foods, interests in certain hobbies or brands (e.g., social network support for fast food). The advertiser may then utilize this information to target the cookies of individuals that have consumer risk factors for being overweight and bid on ad impressions for those cookies when a user visits a content site.

An exemplary system may operate as follows. PHI provider 802 provides healthcare information that includes PHI to a DID agent 804. This can include healthcare information that identifies diagnosed diseases or other health conditions associated with individuals. This information may be treated as highly sensitive. A matching agent 806 may provide a custom list of individuals that identifies individuals and associated consumer information. For example, this information includes PII, HID, and information about the segment of consumers that an individual belongs to. A segment may be any number of consumer-based buckets (e.g., geography, income, etc.). Information may also provide specific information about consumer behavior or the like. This information may include any reasonable consumer information available from existing consumer databases, including data append vendor 807. Data append vendor 807 may provide extended consumer attributes. For example, if matching agent 806 provides an identification of one or more market segments for each individual, the data append vendor may act as a query-able database for providing various consumer attributes. DID agent 804 may provide PII that has been extracted from PHI received from PHI provider 802 and provide a list of individuals by PII to the data append vendor 807. This list may also include a proxy key for each individual in the list, allowing DID agent 804 to easily associate return information with individuals. Data append vendor 807 may then determine the extended attributes for each individual in the list received from DID agent 804. Data append vendor 807 may then provide an extended PII list that includes the PII, proxy key, and extended attributes to DID agent 804. This enables DID agent 804 to identify and correlate consumer information with PHI received from health services providers. Once DID agent 804 receives the extended attributes and segment information, this consumer information may be linked to PII or PHI. Any PHI or PII may then be removed, but the correlation between healthcare information and consumer attributes may still be retained in a privacy compliant manner.

DID agent 804 may then send a list of attributes where healthcare information is correlated with segments and extended attributes. This list may identify individuals by proxy key rather than by PHI or PII. This allows DID agent 804 to act as an honest broker whereby only the broker has information to privacy information. Because the information correlating healthcare information to consumer information has no personally identifiable information, this information may be shared with a modeling agent 808. Modeling agent 808 can then use this list of individuals having certain healthcare and consumer attributes to do a population-based analysis to look for any meaningful correlations between consumer information and healthcare information. This allows modeling agent 808 to create disease state models modeling a disease based on consumer information. Modeling agent 808 can then send these models to NHF provider 810, allowing the NHF provider to utilize these models in the advertising ecosystem. NHF provider 810 may then target paths and cookies based on a disease state models using conventional means, in association with DMPs and DSPs 812.

As shown in FIG. 10, entities to the left of NHF provider 810 are not part of the typical online advertising ecosystem. These entities may communicate via networks or by any other conventional communication means, but are not directly or traditionally related to the advertising ecosystem. These entities generally do not actively participate in creating cookies or utilizing cookies.

FIG. 11 shows an alternate embodiment for creating disease state models and targeting consumers based on these disease state models. As shown in FIG. 11, a matching agent 826 creates segment audiences within the DSP ecosystem. Matching agent 826 may identify a plurality of buckets in which each consumer may fall. Cookies associating each user with one or more of these buckets can be utilized by DSPs 832. Matching agent 826 may then provide a matching agent house list that includes personally identifiable information, an identification of the consumer segment, and HID to DID agent 824. DID agent 824 may also receive PHI information from PHI provider 822. This can allow DID agent 824 to match healthcare information to PII. DID agent 824 can then provide a mapping of HID to proxy keys maintained by DID agent 824. This prevents matching agent 826 from having access to healthcare information, but allows the cookies in the DSP ecosystem to be matched to certain healthcare information anonymously. DID agent 824 then provides a modeling agent list that includes a proxy key, the identified PHI, and consumer segment information for each individual in the list to a modeling agent 828.

Modeling agent 828 can then create diseased state models based on population-based correlations between the PHI and segment information. These disease state models may be provided to NHF provider 830 for use in the advertising ecosystem. NHF provider 830 may then target ads based on disease models utilizing cookies in DSPs 832 which have been provided by matching agent 826. This allows NHF provider 830 to utilize existing cookie information within the advertising ecosystem to target individuals based on the likelihood that an individual has a health condition or may develop the health condition, thereby providing enhanced marketing options for product and service providers in the healthcare industry.

In some embodiments, rather than, or in addition to, receiving additional HDI from the result of a health condition model and the related consumer demographic information for individual consumers, HDI can come from opt-in sources. For example, patients of Blue Cross have recently been able to share their personal healthcare information electronically, allowing them to share PII and PHI with third parties, such as healthcare providers and loved ones, using a service called Blue Button. In some embodiments, patients/consumers can opt in to share their healthcare information with third parties using services such as Blue Button. In some embodiments, consumers can opt in to share their healthcare information through their insurance provider in a manner that strips PII and PHI, such as via the methods described throughout. This can make it easier for consumers to share this information with third parties without risking a loss of privacy control. By using an opt-in service via a third party, the advertising system can utilize voluntary information shared by a consumer that can provide more precise targeting than disease state models.

In some embodiments, health services providers, such as hospitals, insurers, or other providers of patient services can share their customer/patient records with the provider of the NHF for creating private cookies or associations between information in these patient records and the computing device of the patient. For example, HIPAA allows health services providers to utilize patient information to communicate with those patients for purposes related to the provider/patient relationship. Private cookies can be used to facilitate such a communication online using the infrastructure provided by the NHF. For example, an insurer may use such a private cookie or association between a patient record and the patient's device to serve an ad to that device informing the patient about an new prescription drug benefit being offered. By allowing only the provider, or other parties authorized under HIPAA access to that association between device and patient information, patients can be informed via the advertising ecosystem without running afoul of HIPAA or other privacy laws, or generally offending sensibilities of privacy. Accordingly, in some embodiments, HDI can comprise patient information received from a health services provider and the association between the patient's browser or electronic device and the patient information is only accessible to parties (such as the health services provider such as doctor or insurance company) authorized by that health services provider, in accordance with privacy laws. It should be understood that the authorized party or parties could include the health services provider itself.

Figure 12:
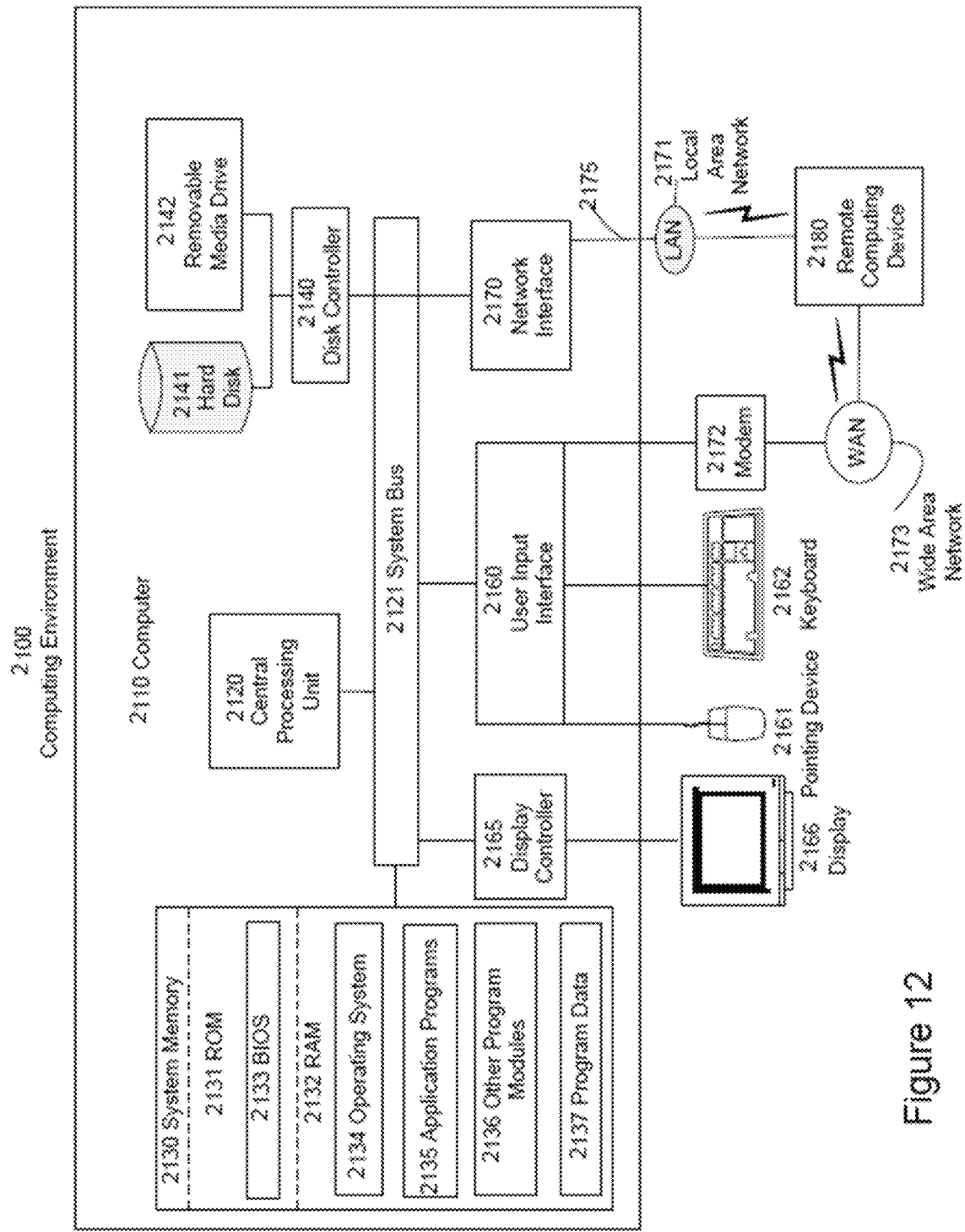
FIG. 12 is a block diagram of an example computing environment in which an example embodiment of the present invention may be implemented.

FIG. 12 illustrates an exemplary computing environment 2100 within which embodiments of the invention may be implemented. Computing environment 2100 may include computer system 2110. Computer system 2110 is one example of a general purpose computing system upon which embodiments of the invention may be implemented. Computers and computing environments, such as computer 2110 and computing environment 2100 are known to those of skill in the art and thus are described briefly here.

As shown in FIG. 12, the computer system 2110 may include a bus 2121 or other communication mechanism for communicating information, and a processor 2120 coupled with the bus 2121 for processing the information. The computer system 2110 may also include a system memory 2130 coupled to the bus 2121 for storing information and instructions to be executed by processor 2120. Is should be understood that each of the network participating components can be described as clients and servers as appropriate for implanting the methods described herein. For example, each component described in the exemplary advertising ecosystems can be carried out by one or more processors on one or more server.

The system memory 2130 may include computer storage media in the form of volatile and/or nonvolatile memory, such as read only memory (ROM) 2131 and/or random access memory (RAM) 2132. The system memory RAM 2132 may include other dynamic storage device(s) (e.g., dynamic RAM (DRAM), static RAM (SRAM), and synchronous DRAM (SDRAM)). The system memory ROM 2131 may include other static storage device(s) (e.g., programmable ROM (PROM), erasable PROM (EPROM), and electrically erasable PROM (EEPROM)). In addition, the main memory 2130 may be used for storing temporary variables or other intermediate information during the execution of instructions by the processor 2120.

A basic input/output system 2133 (BIOS) containing the basic routines that help to transfer information between elements within computer 2110, such as during start-up, may be stored in ROM 2131. RAM 2132 may contain data and/or program modules that are immediately accessible to and/or presently being operated on by central processing unit 2120. System memory 2130 additionally may include, for example, operating system 2134, application programs 2135, other program modules 2136 and program data 2137.

The computer system 2110 also includes a disk controller 2140 coupled to the bus 2121 to control one or more storage devices for storing information and instructions, such as a magnetic hard disk 2141, a removable media drive 2142 (e.g., floppy disk drive, read-only compact disc drive, read/write compact disc drive, compact disc jukebox, tape drive, and removable magneto-optical drive). The storage devices may be added to the computer system 2110 using an appropriate device interface (e.g., a small computer system interface (SCSI), integrated device electronics (IDE), enhanced-IDE (E-IDE), direct memory access (DMA), or ultra-DMA.

The computer system 2110 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2110 may also include a display controller 2165 coupled to the bus 2121 to control a display or monitor 2166, such as a cathode ray tube (CRT) or liquid crystal display (LCD), for displaying information to a computer user. The computer system includes an input interface 2160 and one or more input devices, such as a keyboard 2161 and a pointing device 2162, for interacting with a computer user and providing information to the processor 2120. The pointing device 2162, for example, may be a mouse, a trackball, or a pointing stick for communicating direction information and command selections to the processor 2120 and for controlling cursor movement on the display 2166. In addition, a printer may provide printed listings of data stored and/or generated by the computer system 2110.

The computer system 2110 may perform a portion or all of the processing steps of embodiments of the invention in response to the processor 2120 executing one or more sequences of one or more instructions contained in a memory, such as the system memory 2130. Such instructions may be read into the system memory 2130 from another computer readable medium, such as a hard disk 2141 or a removable media drive 2142. The hard disk 2141 may contain one or more datastores and data files used by embodiments of the advertising system. Datastore contents and data files may be encrypted to improve security. One or more processors in a multi-processing arrangement may also be employed to execute the one or more sequences of instructions contained in system memory 2130. In alternative embodiments, hard-wired circuitry may be used in place of or in combination with software instructions. Thus, embodiments are not limited to any specific combination of hardware circuitry and software.

As stated above, the computer system 2110 may include at least one computer readable medium or memory for holding instructions programmed according to embodiments of the invention and for containing data structures, tables, records, or other data described herein. Non-limiting examples of computer readable media include hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read instructions.

Stored on any one or on a combination of computer readable media, embodiments of the present invention include software for controlling the computer system 2110, for driving a device or devices for implementing the invention, and for enabling the computer system 2110 to interact with a human user. Such software may include, but is not limited to, device drivers, operating systems, development tools, and applications software. Such computer readable media further comprises a computer program product for performing all or a portion (if processing is distributed) of the processing performed in implementing embodiments of the invention.

Components of the computer system 2110 which interpret one or more sequences of instructions may be any interpretable or executable code component including, but not limited to, scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2120 for execution. A computer readable medium may take many forms including, but not limited to, non-volatile media, volatile media, and transmission media. Non-limiting examples of non-volatile media include optical, magnetic disks, and magneto-optical disks, such as hard disk 2141 or removable media drive 2142. Non-limiting examples of volatile media include dynamic memory, such as system memory 2130. Non-limiting examples of transmission media include coaxial cables, copper wire, and fiber optics, including the wires that make up the bus 2121. Transmission media may also take the form of acoustic or light waves, such as those generated during radio wave and infrared data communications.

Various forms of computer readable media may be involved in carrying out one or more sequences of one or more instructions to processor 2120 for execution. For example, the instructions may initially be carried on a magnetic disk of a remote computer. The remote computer may load the instructions for implementing all or a portion of the present invention remotely into dynamic memory and send the instructions over a telephone line using a modem. A modem local to the computer system 2110 may receive the data on the telephone line and use an infrared transmitter to convert the data to an infrared signal. An infrared detector coupled to the bus 2121 may receive the data carried in the infrared signal and place the data on the bus 2121. The bus 2121 carries the data to the system memory 2130, from which the processor 2120 may retrieve and execute the instructions. The instructions received by the system memory 2130 may optionally be stored on storage device 2141 or 2142 either before or after execution by processor 2120.

The computing environment 2100 may further include the computer system 2110 operating in a networked environment using logical connections to one or more remote computers, such as remote computer 2180. Remote computer 2180 may be a personal computer (laptop or desktop), a mobile device, a server, a router, a network PC, a peer device or other common network node, and typically includes many or all of the elements described above relative to computer 2110. The logical connections depicted in FIG. 12 include local area network (LAN) 2171 and wide area network (WAN) 2173, but may also include other networks. Such networking environments may be common in offices, enterprise-wide computer networks, intranets, and the Internet. Communications may occur via hard wired and/or wireless means.

When used in a LAN networking environment, computer 2110 may be connected to LAN 2171 through network interface 2170. When used in a WAN 2173 networking environment, computer 2110 may include modem 2172 for establishing communications over WAN 2173, such as the Internet. Modem 2172 may be connected to system bus 2121 via user input interface 2160, or other appropriate mechanism.

As shown, the computer system 2110 may include a communication interface 2175 coupled to the bus 2121. The communication interface 2175 provides a two-way data communication coupling to a network link 2171, 2173 that is connected to, for example, a local area network (LAN) 2171, or to another communications network 2173, such as the Internet. For example, the communication interface 2175 may be a network interface card to attach to any packet switched LAN. As another example, the communication interface 2175 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2175 sends and receives electrical, electromagnetic, or optical signals that carry digital data streams representing various types of information.

Computer 2110 or other client device can be deployed as part of a computer network. In this regard, various embodiments pertain to any computer system having any number of memory or storage units, and any number of applications and processes occurring across any number of storage units or volumes. An embodiment may apply to an environment with server computers and client computers deployed in a network environment, having remote or local storage. An embodiment may also apply to a standalone computing device, having programming language functionality, interpretation and execution capabilities.

As described herein, the various systems, subsystems, agents, managers, and processes can be implemented using hardware components, software components, and/or combinations thereof.

The World Wide Web, commonly referred to as the Web, is a system of interlinked hypertext documents accessed via the Internet. With a web browser, one can view web pages that may contain text, images, videos, text over video, and other multimedia and navigate between them by using hyperlinks. The terms Internet and World Wide Web are often used in everyday speech without much distinction. However, the Internet and the World Wide Web are not one and the same. The Internet is a global system of interconnected computer networks, while the Web is one of the services that run on the Internet. The web is a collection of interconnected documents and other resources, linked by hyperlinks and URLs. As such, the Web is an application running on the Internet. Viewing a web page on the World Wide Web normally begins either by typing the URL of the page into a web browser, or by following a hyperlink to that page or resource. The web browser then initiates a series of communication messages, behind the scenes, in order to fetch and display it.

For example, the server-name portion of the URL is resolved into an IP address using the global, distributed Internet database known as the Domain Name System (DNS). This IP address is necessary to contact the Web server. The browser then requests the resource by sending an HTTP request to the Web server at that particular address. In the case of a typical web page, the HTML text of the page is requested first and parsed immediately by the web browser, which then makes additional requests for images and any other files that complete the page image.

While receiving these files from the web server, browsers may progressively render the page onto the screen as specified by its HTML, Cascading Style Sheets (CSS), or other page composition languages. Any images and other resources are incorporated to produce the on-screen web page that the user sees. Most web pages contain hyperlinks to other related pages and perhaps to downloadable files, source documents, definitions and other web resources. Such a collection of useful, related resources, interconnected via hypertext links is dubbed a web of information.

Although the invention has been described with reference to exemplary embodiments, it is not limited thereto. While the demographic information is described with an emphasis on healthcare information, other demographic information may be used in certain embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method comprising:
receiving, at a first server, information from a computing device;
associating the computing device with a first set of healthcare demographic information corresponding to an identity of a user of the computing device;
stripping Protected Health Information (PHI) from the first set of healthcare demographic information;
creating a cookie that correlates a browser on the computing device to the first set of healthcare demographic information;
sending the cookie to the computing device, wherein the cookie is configured to allow subsequent association of the first set of healthcare demographic information with the browser;
receiving, by a second server, a request to serve an ad impression to the computing device, wherein the request specifies demographic attributes; and
serving the ad impression to the computing device when the first set of healthcare demographic information matches the demographic attributes, wherein the first set of healthcare demographic information is identified based on the cookie.

2. The method of claim 1, further comprising:
determining if the first set of healthcare demographic information associated with the cookie matches selected demographic criteria to determine whether to bid on the ad impression.

3. The method of claim 1, wherein the first set of healthcare demographic information comprises an identification that the user is in a group of consumers that have an increased likelihood of having a predetermined health condition.

4. The method of claim 1, further comprising:
receiving, at a matching agent, a consumer file including the PHI;
adding, at the matching agent, a healthcare ID to the consumer file;
sending the consumer file with the healthcare ID from the matching agent to a de-identification agent;
with the de-identification agent,
removing the PHI from the consumer file,
adding a proxy key to the consumer file,
removing a portion of the consumer file based on the first set of the healthcare demographic information that comprises patient information received from a health services provider, and
sending the consumer file to the matching agent; and
creating, with the matching agent, the at least one identifier from the consumer file received from the de-identification agent.

5. The method of claim 1, wherein the demographic attributes comprise an identification that the user is in a group of consumers that have an increased likelihood of having a predetermined health condition.

6. The method of claim 1, further comprising automatically generating a bid for the right to display the ad impression.

7. The method of claim 1, wherein the first set of healthcare demographic information is received from a health services provider via a trusted intermediary.

8. The method of claim 7, further comprising utilizing the trusted intermediary to correlate the first set of healthcare demographic information with the user without exposing PHI of the user to third parties.

9. The method of claim 1, wherein the computing device is a set top box associated with at least one household and is configured to display live TV to viewers in the household.

10. The method of claim 1, further comprising:
receiving a national health file at a data mining provider, the national health file including demographic information for a plurality of users;
determining the identity of the user of the computing device upon the user accessing a web site;
matching the likely identity of the user to one of the plurality of users and creating the identifier based upon the match; and
transmitting the identifier to the computing device.

11. The method of claim 1, further comprising:
receiving, at a matching agent, a consumer healthcare file that includes the PHI;
associating, at the matching agent, the consumer healthcare file with a healthcare ID and adding the healthcare ID to the consumer healthcare file;
sending the healthcare ID to a party that is not authorized to access the PHI;
sending the consumer healthcare file from the matching agent to a de-identification agent;
verifying, at the de-identification agent, that the consumer healthcare file includes a selected health attribute;
following the verification step, removing the PHI from the consumer healthcare file and adding a proxy key to the consumer healthcare file;
transmitting the proxy key and the healthcare ID to the matching agent; and
at the matching agent, creating the identifier and associating the identifier with at least one of the proxy key and the healthcare ID.

12. The method of claim 1, further comprising bidding on an ad exchange for ad impressions associated with the browser running on the computing device.

13. The method of claim 1 wherein the step of serving the ad impression is performed by a cable services provider and the computing device is associated with at least one cable services subscriber.

14. The method of claim 1, wherein the first set of healthcare demographic information comprises insured status information identifying whether the user has health insurance.

15. The method of claim 14 wherein the insured status information is received from at least one health services provider used by the user.

16. The method of claim 1, wherein the computing device is selected from a group consisting of an IPTV device, a mobile TV device, and a satellite TV device.

17. A system, comprising:
a first server configured to:
receive information from a computing device;
associate the computing device with a first set of healthcare demographic information corresponding to an identity of a user of the computing device;
strip Protected Health Information (PHI) from the first set of healthcare demographic information;
create a cookie that correlates a browser on the computing device to the first set of healthcare demographic information; and
send the cookie to the computing device, wherein the cookie is configured to allow subsequent association of the first set of healthcare demographic information with the browser;
a second server configured to:
receive a request to serve an ad impression to the computing device, wherein the request specifies demographic attributes; and
serve the ad impression to the computing device when the first set of healthcare demographic information matches the demographic attributes, wherein the first set of healthcare demographic information is identified based on the cookie.

18. The system of claim 17, wherein the first set of healthcare demographic information comprises an identification that the user is in a group of consumers that have an increased likelihood of having a predetermined health condition.

19. A non-transitory computer-readable device having instructions stored thereon that, when executed by a computing device, causes the computing device to perform operations comprising:
associating the computing device with a first set of healthcare demographic information corresponding to an identity of a user of the computing device;
stripping Protected Health Information (PHI) from the first set of healthcare demographic information;
creating a cookie that correlates a browser on the computing device to the first set of healthcare demographic information;
storing the cookie on the computing device, wherein the cookie is configured to allow subsequent association of the first set of healthcare demographic information with the browser; and
serving an ad impression on the computing device when the first set of healthcare demographic information matches demographic attributes received in a request to serve the ad impression, wherein the first set of healthcare demographic information is identified based on the cookie.

20. The non-transitory computer-readable device of claim 19, wherein the first set of healthcare demographic information comprises an identification that the user is in a group of consumers that have an increased likelihood of having a predetermined health condition.

* * * * *

UNITED STATES PATENT AND TRADEMARK OFFICE
CERTIFICATE OF CORRECTION

| | | |
|---|---|---|
| PATENT NO. | : 10,600,088 B2 | Page 1 of 1 |
| APPLICATION NO. | : 14/263559 | |
| DATED | : March 24, 2020 | |
| INVENTOR(S) | : Jeffrey A. Dittus | |

It is certified that error appears in the above-identified patent and that said Letters Patent is hereby corrected as shown below:

In the Specification

In Column 4, Line 23, please replace "000" with --000.--.

In Column 8, Line 16, please replace "anonymized" with --anonymized.--.

In Column 8, Line 48, please replace "(e.g." with --(e.g.,--.

In Column 25, Line 40, please replace "a honest" with --an honest--.

In Column 29, Line 47, please replace "an new" with --a new--.

In the Claims

In Column 35, Claim 10, Line 6, please replace "web site;" with --website;--.

In Column 35, Claim 10, Line 7, please replace "likely identity" with --identity--.

Signed and Sealed this
Eighteenth Day of August, 2020

Andrei Iancu
*Director of the United States Patent and Trademark Office*